(12) United States Patent
Schmidt et al.

(10) Patent No.: US 7,263,174 B2
(45) Date of Patent: *Aug. 28, 2007

(54) PREDICTING PERFORMANCE OF TELEPHONE LINES FOR DATA SERVICES

(75) Inventors: Kurt E. Schmidt, Burlington, WI (US); David J. Groessl, Vernon Hills, IL (US); Yun Zhang, Wheeling, IL (US)

(73) Assignee: Teradyne, Inc., Boston, MA (US)

( * ) Notice: Subject to any disclaimer, the term of this patent is extended or adjusted under 35 U.S.C. 154(b) by 52 days.

This patent is subject to a terminal disclaimer.

(21) Appl. No.: 11/060,904

(22) Filed: Feb. 18, 2005

(65) Prior Publication Data
US 2005/0135566 A1 Jun. 23, 2005

Related U.S. Application Data

(62) Division of application No. 09/294,563, filed on Apr. 20, 1999, now Pat. No. 6,895,081.

(51) Int. Cl.
*H04M 1/24* (2006.01)
*H04M 3/08* (2006.01)
*H04M 3/22* (2006.01)

(52) U.S. Cl. ............... 379/1.04; 379/22.02; 379/22.07; 379/24; 379/30; 379/32.02; 324/525; 324/527

(58) Field of Classification Search ...... 379/1.01–1.04, 379/22.02, 22.07, 24, 27.01, 30, 32.02; 324/525–527
See application file for complete search history.

(56) References Cited

U.S. PATENT DOCUMENTS 3,882,287 A 5/1975 Simmonds
4,087,657 A 5/1978 Peoples
4,186,283 A 1/1980 Simmonds
4,529,847 A 7/1985 DeBalko
4,620,069 A 10/1986 Godwin et al.
4,868,506 A 9/1989 DiStefano
5,025,221 A 6/1991 Blaess
5,083,086 A 1/1992 Steiner (Continued)

FOREIGN PATENT DOCUMENTS

EP 0722164 A1 7/1996

(Continued)

OTHER PUBLICATIONS

IEEE Std 743-1995 "IEEE Standard Equipment Requirements and Measurement Techniques for Analog Transmission Parameters for Telecommunications" 1996.

(Continued)

*Primary Examiner*—Binh K. Tieu
(74) *Attorney, Agent, or Firm*—Wolf, Greenfield & Sacks P.C.

(57) ABSTRACT

A method characterizes a customer line for data transmission. The method includes measuring electrical properties of the customer line from a central location, identifying a line model from the measurements, and identifying a modem model for a modem selected for use with the customer line. The modem model gives performance data for the selected modem. The method also predicts performance data for the customer line when operated with the selected modem by combining the line and modem models.

39 Claims, 13 Drawing Sheets

U.S. PATENT DOCUMENTS

| | | |
|---|---|---|
| 5,121,420 A | 6/1992 | Marr et al. |
| 5,128,619 A | 7/1992 | Bjork et al. |
| 5,157,336 A | 10/1992 | Crick |
| 5,270,661 A | 12/1993 | Burnett |
| 5,302,905 A | 4/1994 | Crick |
| 5,319,311 A | 6/1994 | Kawashima et al. |
| 5,400,321 A | 3/1995 | Nagato |
| 5,402,073 A | 3/1995 | Ross |
| 5,404,388 A | 4/1995 | Eu |
| 5,436,953 A | 7/1995 | Nilson |
| 5,461,318 A | 10/1995 | Borchert et al. |
| 5,465,287 A | 11/1995 | Egozi |
| 5,528,661 A | 6/1996 | Siu et al. |
| 5,528,679 A | 6/1996 | Taarud |
| 5,606,592 A | 2/1997 | Galloway et al. |
| 5,629,628 A | 5/1997 | Hinds et al. |
| 5,636,202 A | 6/1997 | Garney |
| 5,680,391 A | 10/1997 | Barron et al. |
| 5,699,402 A | 12/1997 | Bauer et al. |
| 5,758,027 A | 5/1998 | Meyers et al. |
| 5,790,523 A | 8/1998 | Ritchie, Jr. et al. |
| 5,864,602 A | 1/1999 | Needle |
| 5,870,451 A | 2/1999 | Winkler et al. |
| 5,881,130 A | 3/1999 | Zhang |
| 5,937,033 A | 8/1999 | Bellows |
| 5,956,386 A | 9/1999 | Miller |
| 5,978,449 A | 11/1999 | Needle |
| 6,002,671 A | 12/1999 | Kahkoska et al. |
| 6,014,425 A | 1/2000 | Bingel et al. |
| 6,026,145 A | 2/2000 | Bauer et al. |
| 6,084,946 A | 7/2000 | Beierle |
| 6,091,338 A | 7/2000 | Natra |
| 6,091,713 A | 7/2000 | Lechleider et al. |
| 6,107,867 A | 8/2000 | Lakshmikumar |
| 6,111,861 A | 8/2000 | Burgess |
| 6,115,466 A | 9/2000 | Bella |
| 6,118,860 A | 9/2000 | Hillson et al. |
| 6,154,447 A | 11/2000 | Vedder |
| 6,169,785 B1 | 1/2001 | Okazaki |
| 6,177,801 B1 | 1/2001 | Chong |
| 6,181,775 B1 | 1/2001 | Bella |
| 6,192,109 B1 | 2/2001 | Amrany et al. |
| 6,205,202 B1 | 3/2001 | Yoshida et al. |
| 6,209,108 B1 | 3/2001 | Pett et al. |
| 6,215,854 B1 | 4/2001 | Walance |
| 6,215,855 B1 | 4/2001 | Schneider |
| 6,226,356 B1 | 5/2001 | Brown |
| 6,240,177 B1 | 5/2001 | Guntzburger et al. |
| 6,256,377 B1 | 7/2001 | Murphree et al. |
| 6,263,047 B1 | 7/2001 | Randle et al. |
| 6,263,048 B1 | 7/2001 | Nelson et al. |
| 6,266,395 B1 | 7/2001 | Liu et al. |
| 6,285,653 B1 | 9/2001 | Koeman et al. |
| 6,292,468 B1 | 9/2001 | Sanderson |
| 6,292,539 B1 | 9/2001 | Eichen et al. |
| 6,349,130 B1 | 2/2002 | Posthuma et al. |
| 6,366,644 B1 | 4/2002 | Sisk et al. |
| 6,385,297 B2 | 5/2002 | Faulkner et al. |
| 6,389,109 B1 | 5/2002 | Schmidt et al. |
| 6,445,733 B1 | 9/2002 | Zuranski et al. |
| 6,456,694 B1 | 9/2002 | Posthuma |
| 6,463,126 B1 | 10/2002 | Manica et al. |
| 6,466,647 B1 | 10/2002 | Tennyson |
| 6,487,276 B1 | 11/2002 | Rosen et al. |
| 6,507,870 B1 | 1/2003 | Yokell et al. |
| 6,513,025 B1 | 1/2003 | Rosen |
| 6,614,880 B1 | 9/2003 | Lysaght et al. |
| 6,687,336 B1 | 2/2004 | Holeva |
| 6,741,676 B2 | 5/2004 | Rudinsky et al. |
| 6,781,386 B2 | 8/2004 | LeHenaff |
| 6,826,258 B2 * | 11/2004 | Afzal ........................ 379/1.04 |
| 6,895,081 B1 * | 5/2005 | Schmidt et al. ............ 379/1.01 |
| 6,901,137 B2 * | 5/2005 | Rosen et al. ................ 379/1.03 |
| 2002/0089999 A1 | 7/2002 | Binde |
| 2003/0048756 A1 | 3/2003 | Chang et al. |
| 2005/0135566 A1 * | 6/2005 | Schmidt et al. ............ 379/1.04 |

FOREIGN PATENT DOCUMENTS

| | | |
|---|---|---|
| WO | WO91/11872 | 8/1991 |
| WO | WO98/44428 A1 | 10/1998 |
| WO | WO99/63427 A1 | 12/1999 |
| WO | WO 00/27134 | 5/2000 |
| WO | WO 00/64132 | 10/2000 |
| WO | WO 01/01597 A1 | 1/2001 |
| WO | WO 01/24490 | 4/2001 |
| WO | WO 01/67729 A1 | 9/2001 |

OTHER PUBLICATIONS

"Loop Qualification, Prerequisite for Volume xDSL Deployment,"The TeleChoice Report on xDSL, vol. 2, No. 3, Mar. 1997

Backer, et al., "Telephone Access Network Measurements," 1998, Tektronix XP002148949.

Goralski, "xDSL Loop Qualification and Testing," IEEE Communications Magazine, May 1999.

Harris Communications, National Communications from Presentation, Chicago, IL Oct. 5, 1998.

Heikman Product Information Release, "Introducing Hekimian's Comprehensive ADSL Test Solution,".

Roehrkasten, "Meassung Von SDSL=Parametern", Nachrichtentechnik Electronik, DE Veb Verlag Technik. Berlin, vol. 48, No. 2, Mar. 1, 1998, pp. 20-21.

Stewart, "Testing ADSL: The Easier, The Better," America's Network, Dec. 15, 1998.

Turnstone Systems, Inc., Product Literature and Presentation at Turnstone Systems, Inc., Sep. 1992.

Woloszynski, "It's Here," Bellcore Exchange Magazine, Jun. 1998.

Zieman, "ADSL Line Qualification Tests," Online!, Wandel and Goltermann, http://www.wg.com/appnotes/adsltest.html.

Stewart, "Testing ADSL: The Easier the Better, America's Network," Dec. 15, 1998 pp. 24-27.

Harris White Paper, "Testing in the Unbundled Loop: The Challenge for ILECS and C:ECS". pp. 1 -.

"Network and Customer Installation Interfaces—Asymmetric Digital Subscriber Line (ADSL) Metallic Interface," ANSI T10413-1998. Revision of ASSI T1. 413-1995 (Not Published).

Eichen, et al., "DSTS: An Expert System for Diagnosis of Advanced Digital Subscriber Services," IEEE Network Operations and Management Symposium, U.S. NY, vol. Conf. 10, pp. 794-804.

Hedlund, et al., DSL Loop Test Telephony, vol. 235, No. 8, Aug. 24, 1998.

Boets, et al. "The Modelling Aspect of Transmission Line Networks," May 12, 1992, pp. 137-141.

Chiu et al. "Loop Survey in the Taiwan Area and Feasibility Study for HDSL," IEEE, vol. 9, No. 6, Aug. 1991, pp. 801-809.

Rye Senjen et al, "Hybrid Expert Systems for Monitoring and for Diganosis", proceedings of the Conference on Artifical Intelligence for Applications, IEEE, Comp. Soc. Press. vol. Conf. 9, Mar. 1, 1993, pp. 235-241.

U.S. Appl. No. 11/007,970, filed Dec. 9, 2004, Faulkner.
U.S. Appl. No. 11/005,055, filed Dec. 6, 2004, Faulkner.
U.S. Appl. No. 10/672,821, filed Sep. 26, 2003, Afzal.
U.S. Appl. No. 10/399,641, filed Jul. 30, 2003, Bauer.
U.S. Appl. No. 10/236,128, filed Jan. 9, 2003, Rosen et al.
U.S. Appl. No. 10/220,716, filed Nov. 26, 2002, Faulkner et al.
U.S. Appl. No. 10/260,950, filed Sept. 30, 2002, Holeva.
U.S. Appl. No. 10/199,589, filed Dec. 20, 2001, Faulkner.
U.S. Appl. No. 10/332,777, filed Jul. 16, 2001, Faulkner.
U.S. Appl. No. 09/692,169, filed Oct. 19, 2000, Rosen.
U.S. Appl. No. 09/294,563, filed Apr. 20, 1999, Schmidt et al.

* cited by examiner

PREDICTING PERFORMANCE OF TELEPHONE LINES FOR DATA SERVICES

RELATED APPLICATIONS

This application is a divisional application claiming the benefit under 35 U.S.C. §120 of U.S. application Ser. No. 09/294,563, now U.S. Pat. No. 6,895,081 entitled "PREDICTING PERFORMANCE OF TELEPHONE LINES FOR DATA SERVICES," filed on Apr. 20, 1999 now U.S. Pat. No. 6,895,081, which is herein incorporated by reference in its entirety.

BACKGROUND OF THE INVENTION

This application relates generally to communications networks and more particularly to predicting the performance of telephone lines for transmitting data.

As is known in the art, public switch telephone networks, i.e., so-called plain old telephone service (POTS) lines, were originally designed for voice communications which cover a limited frequency bandwidth (i.e., about 4 KHz). Today, it is desired to use the same POTS lines for data transmission. Data signals, however, generally have different frequency characteristics than voice signals. As a result, a POTS line that works well transmitting voice signals might not work well, or at all, for data signals. Telephone companies need to know which lines are suitable, i.e., qualify, and which lines are not suitable for data transmission. Telephone companies also need to know why particular lines are unable to support data transmissions and where such faults occur so they can determine whether the transmission line can be corrected.

The telephone network was originally designed for voice communication. Voice communication covers a limited frequency bandwidth. In some cases, telephone lines were optimized for signals in this frequency range. Even where the lines were not optimized for voice signals, there was no incentive to make the lines operate at other frequencies and often they did not.

Now, it is desired to use those same lines to carry data signals. The data signals generally have different frequency characteristics than the voice signals. As a result, a line that works very well transmitting voice signals might not work well or at all for data signals. Phone companies need to know which lines will work for data signals and use those lines for data.

Line Qualification is the overall ability to make statements about the quality of a subscriber loop as it relates to its ability to deliver voice communications (i.e. POTS), or data services. Disqualification is the ability to make a statement with a high degree of confidence that a subscriber loop will not support a data service without remedial actions. Pre-qualification is the ability to make a statement with a high degree of confidence that a subscriber loop will support a data service without remedial actions.

Telephone operating companies (TELCO's) have two problems to solve in qualifying subscriber loops for delivery of data. The first problem is strategic. Telco's are reluctant to deploy emerging technologies for the delivery of data (e.g., ISDN or ADSL) because there is uncertainty in their knowledge that sufficient of the subscriber loops are of high enough quality to make deployment economically successful. This discourages early adopters because there is significant risk in being first to deliver a technology that may not work in their access network. If Telco's could be given a technology to take much of this risk out of initial deployment, they can secure market share and lead in the face of competition.

The second problem is tactical and comes after a Telco has made a decision to deploy a particular technology. There is a need to qualify, either pro-actively or reactively, specific lines for service as that service is requested by subscribers or targeted by the Telco for delivery. For example, if a Telco is to market and deliver the new service, they would like to target those subscriber loops most likely to support the service out of the box and/or with a minimum of work. As another example, a Telco receiving a new service request from a subscriber desires information to either accept or reject that request for new service based on the condition of their line.

4TEL, a product sold by Teradyne, Inc., of Deerfield, Ill., USA, has been used in the past in support of line qualification for delivery of POTS. Techniques in 4TEL lend themselves to the accurate detection and location of conditions which impair both voice and FSK modems. Modern data transmission techniques (such as those used in V.34, V.90, ISDN, and ADSL) encode data in part by shifting the phase of the carrier frequency(s). As such, these technologies rely upon there being fixed end-to-end and differential transmission characteristics (e.g., phase and echo). The 4TEL line test product connected to telephone lines under test through a voice switch, sometimes called a class 5 switch, or a central office switch, allowing the 4TEL system to make single-ended measurements. Because such switches were designed for relatively low frequency voice signals, this approach has not heretofore been used for predicting performance of lines for carrying relatively high speed data services.

It would be desirable to provide a method or apparatus for easily qualifying lines for high speed data services.

SUMMARY OF THE INVENTION

In one aspect, the invention relates to a method of making a qualification decision on a subscriber line connected through a switch. The method includes connecting a measurement unit to the subscriber line through the switch; making one-ended measurements with the measurement unit of parameters of the subscriber line in a first frequency range; deriving, based on the one-ended measurements, a representation of attenuation by the line of signals in a second, higher frequency range; and making a qualification decision on the suitability of the subscriber line to carry high speed data services based on the representation of attenuation by the line.

In another aspect, the invention relates to a computer program having computer-executable instructions adapted for performing a method of making a qualification decision on a subscriber line connected to a switch in a telephony system having a measurement unit. The computer program generates a control signal to cause the switch to connect the measurement unit to the subscriber line; generates a control signal to cause the measurement unit to make one-ended measurements of parameters of the subscriber line in a first frequency range; derives, based on the one-ended measurements, a representation of attenuation by the line of signals in a second, higher frequency range; and makes a qualification decision on the suitability of the subscriber line to carry high speed data services based on the representation of attenuation of the line in the second frequency range.

In yet a further aspect, the invention relates to a telephony system comprising a switch; a plurality of lines connected to the switch; a measurement unit connected to the switch, the measurement unit switchably connected through the switch to each of the plurality of lines; and a controller, coupled to the measurement unit. The controller is programmed to receive from the measurement unit one-ended measurements on a selected one of the plurality of lines, the measurements made in a first frequency range; derive, based on the one-ended measurements in the first frequency range, a parameter representing the effect of the selected one of the plurality of lines on electrical signals in a second, higher frequency range; and make a qualification decision on the suitability of the selected one of the plurality of lines to carry data services using signals in the second frequency range based on the parameter.

BRIEF DESCRIPTION OF THE DRAWINGS

Other objects, features, and advantages of the invention will be apparent from the following description taken together with the drawings in which.

DESCRIPTION OF THE PREFERRED EMBODIMENTS

This application incorporates U.S. Provisional Application 60/106,845, filed Nov. 3, 1998, by Roger Faulkner et al, now U.S. Pat. No. 6,385,297 B2, by reference in its entirety.

Speed Qualification System

Figure 1:
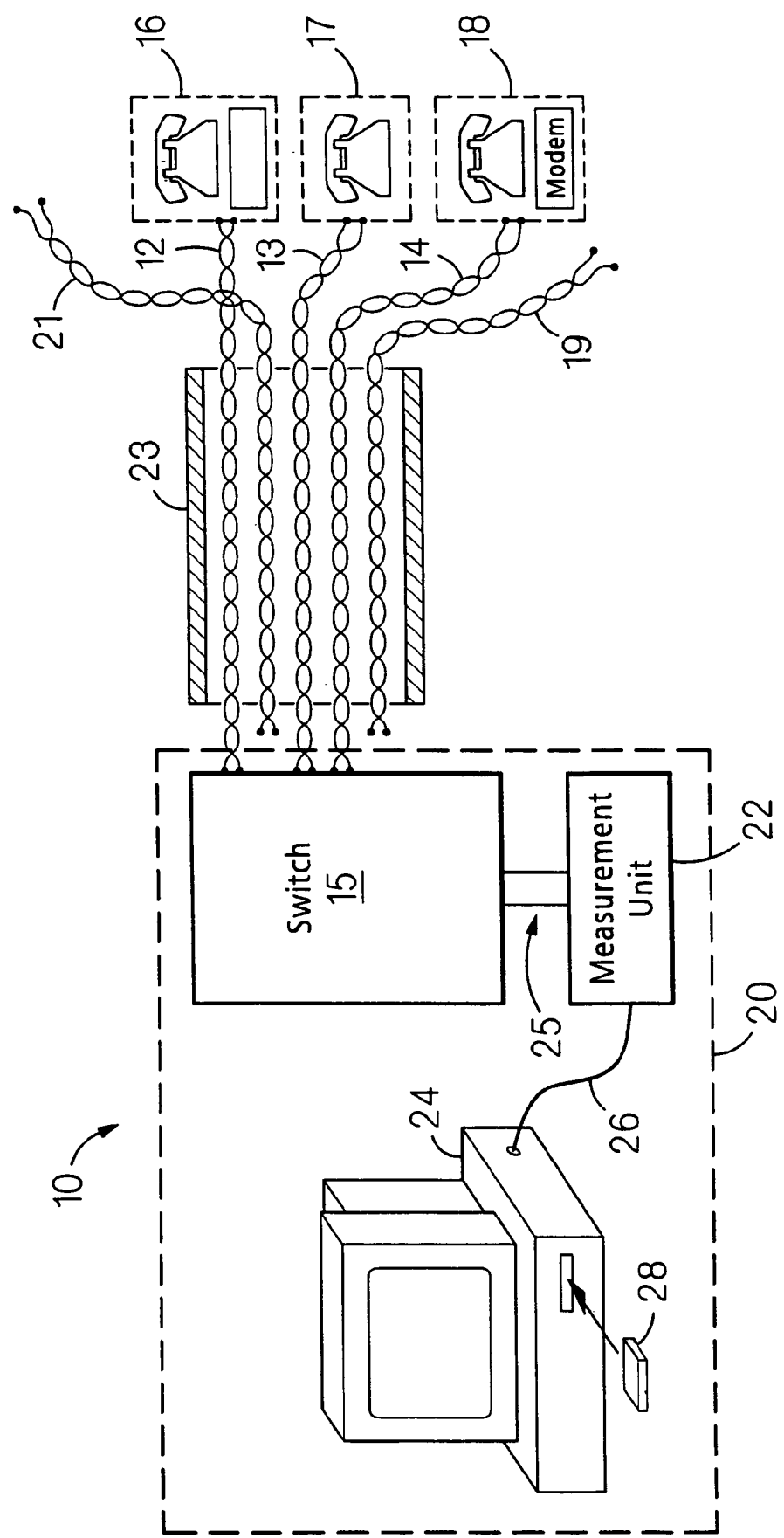
FIG. 1 illustrates a system to speed qualify customer telephone lines for data transmission.

FIG. 1 illustrates a portion of a POTS telephone network 10 for speed qualifying customer telephone lines 12–14, 19, 21. The network 10 includes the customer lines 12–14 that connect customer units 16–18, i.e., modems and/or telephones, to a switch 15 located in a TELCO central office 20.

Each line 12–14 is a standard twisted two-wire copper line adapted for telephone voice communications. The two wires are generally referred to as the ring "R" and tip "T" wires. The switch 15 may be a POTS switch or any other device for connecting the lines 12–14 to a telephone network, e.g., a digital subscriber loop access multiplexer (DSLAM) (not shown). A very large portion of the length of each customer line 12–14 is housed in a standard telephone cable 23 that caries a number of the customer lines 12–14 i.e., more than a dozen. The telephone cable 23 is an environment, which changes the electrical and transmission properties of the individual customer lines 12–14.

The standard cable 23 also houses customer lines 19, 21, i.e., standard twisted pair telephony wires, that are not connected either to the switch 15 or to the customer units 16–18. These lines 19, 21 have been fabricated into the cable in anticipation of increased customer demand at future times. Some of the unconnected lines 19, 21 go to customer residences already having a connected POTS line, e.g., the line 19 goes to the customer connected to the line 14. The other unconnected lines 21 are not routed to a particular customer's residence. But, all the lines 12–14, 19, 21, i.e., connected or unconnected, have a very large portion of their length confined to the telephony cable 23, which similarly influences the transmission properties of each line 12–14, 19, 21 therein.

A measurement unit 22 couples to the switch 15 in the central office 20 via a test bus 25. The measurement unit 22 controls one-ended electrical measurements from the central office 20, which are used to obtain admittances and noise levels for the lines 12–14 being measured. To perform a measurement, the measurement unit 22 signals the switch 15 to disconnect a selected line 12–14 from the telephone network and to connect the selected line 12–14 to measurement apparatus (not shown) within the switch 15. Then, the measurement unit 22 signals the apparatus to perform selected measurements. The measurement unit 22 signals the switch 15 to reconnect the line 12–14 to the network after measurements are completed. The bus 25 returns results from the measurements to the measurement unit 22. Such measurements are described in more detail in U.S. Provisional Application 60/106,845, filed Nov. 3, 1998, now U.S. Pat. No. 6,385,297 B2.

Suffice it to say here that the unit 22 is adapted to test the twisted pair either on demand, or automatically, from a preprogrammed list of lines. It is noted that a subscriber's transmission loop can be tested from the central office because each measurement unit 22 has access to every subscriber through the switch 15 and the techniques employed herein use test signals that pass through switch 15 without undue distortion. The unit 22 gains access to test a subscribers loop through a switched test bus located in the switching element 15. The switched test bus disconnects the line to be tested from the switch 15, and connects it to the measurement unit 22.

The measurement unit 22 is controlled by the computer 26, which selects the type of measurements to be performed and the lines 12–14 upon which the measurements will be performed. The computer 24 sends control signals to the measurement unit 22 through the line 26 and receives the measurement results from the measurement unit 22 via the same line 26. An executable software program, encoded on storage medium 28, coordinates the tests by the measuring unit 22 and the processing of test data to predict data rates.

The measurement unit 22 and computer 24 speed qualify and/or disqualify the customer lines 12–14 and associated modems for selected data transmission speeds. To speed qualify, the computer 28 must determine, with a high degree of certainty, that the qualified line and associated modems will support data transmissions at a specified data rate without remedial measures. To speed disqualify, the computer 28 must determine, with a high degree of certainty, that the disqualified line and associated modems will not support data transmissions at the specified data rate without remedial measures.

Various embodiments make speed qualification determinations either before the line is in service or while the line is in service. Before a line is transmitting data, the determinations are speed pre-qualifications or pre-disqualifications. After a line is transmitting data, determinations are referred to as speed path testing.

One-Ended Measurements on Customer Line

Figure 2:
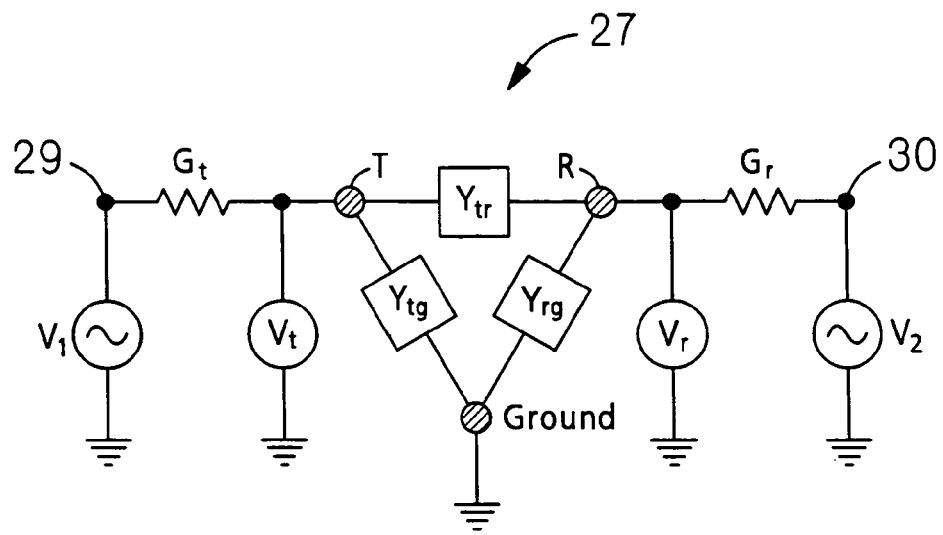
FIG. 2 illustrates a test apparatus for performing one-ended admittance measurements on twisted-pair telephone lines.

FIG. 2 illustrates an apparatus 27 for performing one type of one-ended electrical measurement used for speed qualifying and/or speed disqualifying of the lines 12–14 of FIG. 1. The apparatus 27 measures the admittances of the tip and ring wires T, R of the selected customer line under measurement. The tip and ring wires T, R of the line 12–14 being measured couple to driving voltage sources $V_1$ and $V_2$, respectively, through known conductances $G_t$ and $G_r$. The tip T and ring R wires also connect to voltmeters $V_t$ and $V_r$ for reading the voltage between the tip wire T and ground and between the ring wire R and ground, respectively. The readings from the voltmeters $V_t$ and $V_r$ enable the computer 24 to determine effective admittances $Y_{tg}$, $Y_{tr}$, $Y_{rg}$ between the tip wire T, ring wire R, and ground for the customer line 12–14 being measured.

To determine the admittances $Y_{tg}$, $Y_{tr}$, $Y_{rg}$, the switch 15 connects the voltage sources $V_1$ and $V_2$ and the voltmeters $V_T$ and $V_R$ to the tip and ring wires T, R as shown in FIG. 2. After connecting the apparatus 27, the measurements needed to determine the admittances $Y_{tg}$, $Y_{tr}$, $Y_{rg}$ entail three steps. First, the measurement unit 22 grounds the point 29 and applies voltage $V_2$ while measuring the voltages across the voltmeters $V_r$ and $V_t$. Next, the measurement unit 22 grounds the point 30 and applies voltage $V_1$ while measuring the voltages across the voltmeters $V_r$ and $V_t$. Finally, the unit 22 applies both voltages $V_1$ and $V_2$ and measures voltages across the voltmeters $V_r$ and $V_t$. From these three measurements, the computer 24 determines the admittances $Y_{tg}$, $Y_{tr}$, $Y_{rg}$ at various frequencies.

During measurements for the admittances $Y_{tg}$, $Y_{tr}$, $Y_{rg}$, the apparatus 27 may apply complex driving voltages $V_1$ and $V_2$ that superimpose several frequencies. For example, the driving voltages $V_1$, $V_2$ may take the form: $V(N) = A\Sigma_{i=1-45} \cos(2\Pi\_f_i NT + \phi_i)$. The frequencies $f_i$, sampling cycle values N (at 152.6 Hz), and phases $\phi_i$ are shown in Table 1. The computer 24 Fourier transforms both the driving and measured voltages $V_1$, $V_2$, $V_t$, $V_r$ to separate frequency components. From the Fourier transform, the computer 24 finds the real and imaginary parts of the admittances $Y_{tg}$, $Y_{tr}$, $Y_{rg}$ by well-known circuit-analysis techniques.

TABLE 1

$f_i$:

150, 600, 1050, 1500, 1950, 2400, 2850, 3300, 3750, 4200, 4650, 5100, 5550, 6000, 6450, 6900, 7350, 7800, 8250, 8700, 9150, 9600, 10050, 10500, 10950, 11400, 11850, 12300, 12750, 13200, 13650, 14100, 14550, 15000, 15450, 15900, 16350, 16800, 17250, 17700, 18150, 18600, 19050, 19500, 19950.

TABLE 1-continued

N:

1, 4, 7, 10, 13, 16, 19, 22, 25, 28, 31, 34, 37, 40, 43, 46, 49, 52, 55, 58, 61, 64, 67, 70, 73, 76, 79, 82, 85, 88, 91, 94, 97, 100, 103, 106, 109, 112, 115, 118, 121, 124, 127, 130, 133 respectively.

$\phi_i$:

5.9738, 1.3564, 2.4683, 4.8575, 4.7434, 2.2972, 4.6015, 1.9156, 2.5660, 4.5986, 4.6452, 3.4542, 3.6341, 0.8848, 4.3410, 2.1606, 4.2342, 4.2147, 3.1058, 5.909, 5.2782, 5.1159, 5.4354, 5.6124, 0.5751, 3.8940, 3.3812, 6.0230, 2.3239, 2.7284, 4.8032, 4.1488, 2.3427, 4.6362, 0.9163, 2.9335, 1.0363, 2.3272, 3.2040, 4.0025, 2.0028, 5.8444, 2.4525, 1.4760, 1.1770

From the admittances $Y_{tg}$, $Y_{tr}$, $Y_{rg}$, several derived properties of the lines 12–14 may be determined. First, a line length can be derived from the capacitances $C_{tg}$ and $C_{rg}$ of the tip wire T to ground and of the ring wire R to ground. For standard bundled telephony cables with twisted tip and ring wire T, R pairs, both capacitances are about $17.47 \times 10^{-9}$ Farads per 1,000 feet regardless of the gauge. Thus, the one-ended measurement of capacitances gives a measure of the apparent length of the measured line 12–14. Second, the existence of a bridged tap in one of the lines 12–14 can be derived from the existence of an above-threshold peak in the ratio:

$$IM\left(\frac{\partial^2 Y_{tg}(f)}{\partial f^2}\right) / RE\left(\frac{\partial^2 Y_{tg}(f)}{\partial f^2}\right)$$

The presence of a bridged tap substantially effects the capacative measurement of the length of the line. Third, the admittances $Y_{tg}$, $Y_{tr}$, $Y_{rg}$ can also be used to predict the gauge mix of the measured lines 12–14. The gauge mix of a line is the ratio of the sum of lengths of the line, which are fat wire, over the full length of the line. Typically, fat wire is 22 and 24 gauge wire, and thin wire is 26 gauge wire. The customer lines 12–14, 19, 21 of FIG. 1 may have segments of fat wire and segments of thin wire. Fourth, a frequency dependent attenuation up to high frequencies can be derived. Attenuation is also sometimes referred to as "line insertion loss."

A two step procedure is used to derive the high frequency attenuation of the measured lines 12–14. First, the attenuation of the lines is approximated by the frequency (f) dependent average attenuation, AT(f). AT(f) is the attenuation of an "average" mixed gauge twisted copper line in a standard telephony cable. The average attenuation AT(f) is known to approximately be:

$$AT(x\text{MHz}) = A(x\text{MHz})C_{tg} \text{ with}$$

$$(A(.1\text{MHz}), A(.3\text{MHz}), A(.4\text{MHz}), A(.5\text{MHz}))$$

$$= (.173, .24, .263, .288) DB/10^{-9} F.$$

Figure 3:
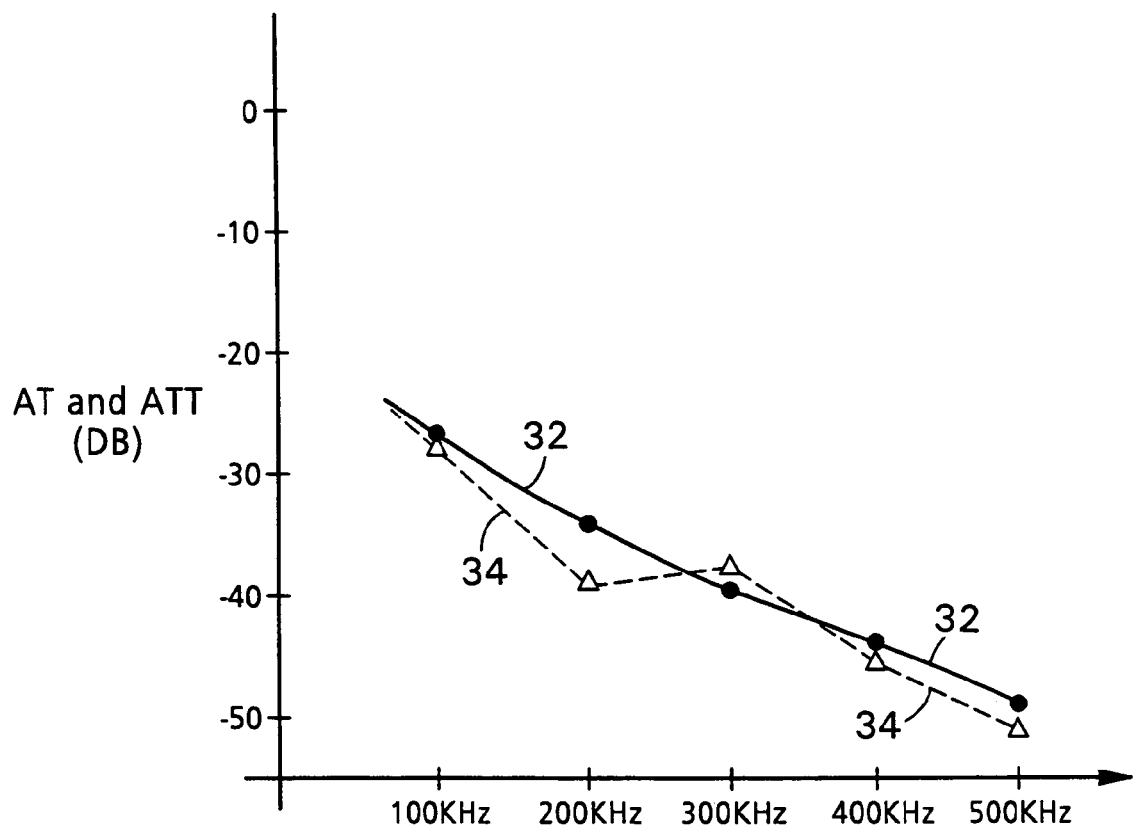
FIG. 3 graphically represents the frequency dependent attenuation both for an average twisted wire pair located in a standard telephony cable and for a particular customer line.
Figure 4A:
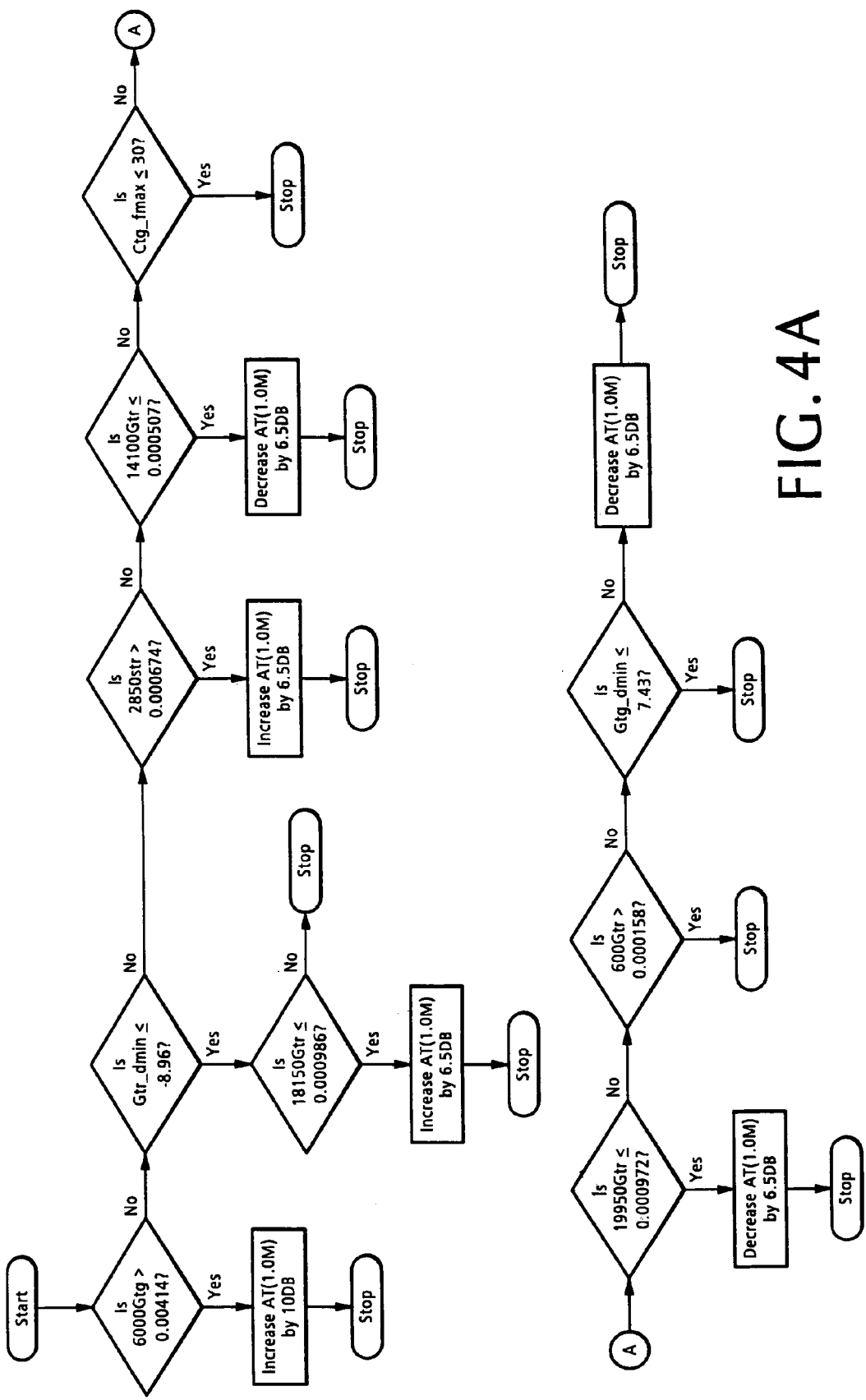
FIGS. 4A–4D are flow charts illustrating a method of finding the attenuation of a line from the attenuation for an average line of FIG. 3 and one-ended measurements.
Figure 4B:
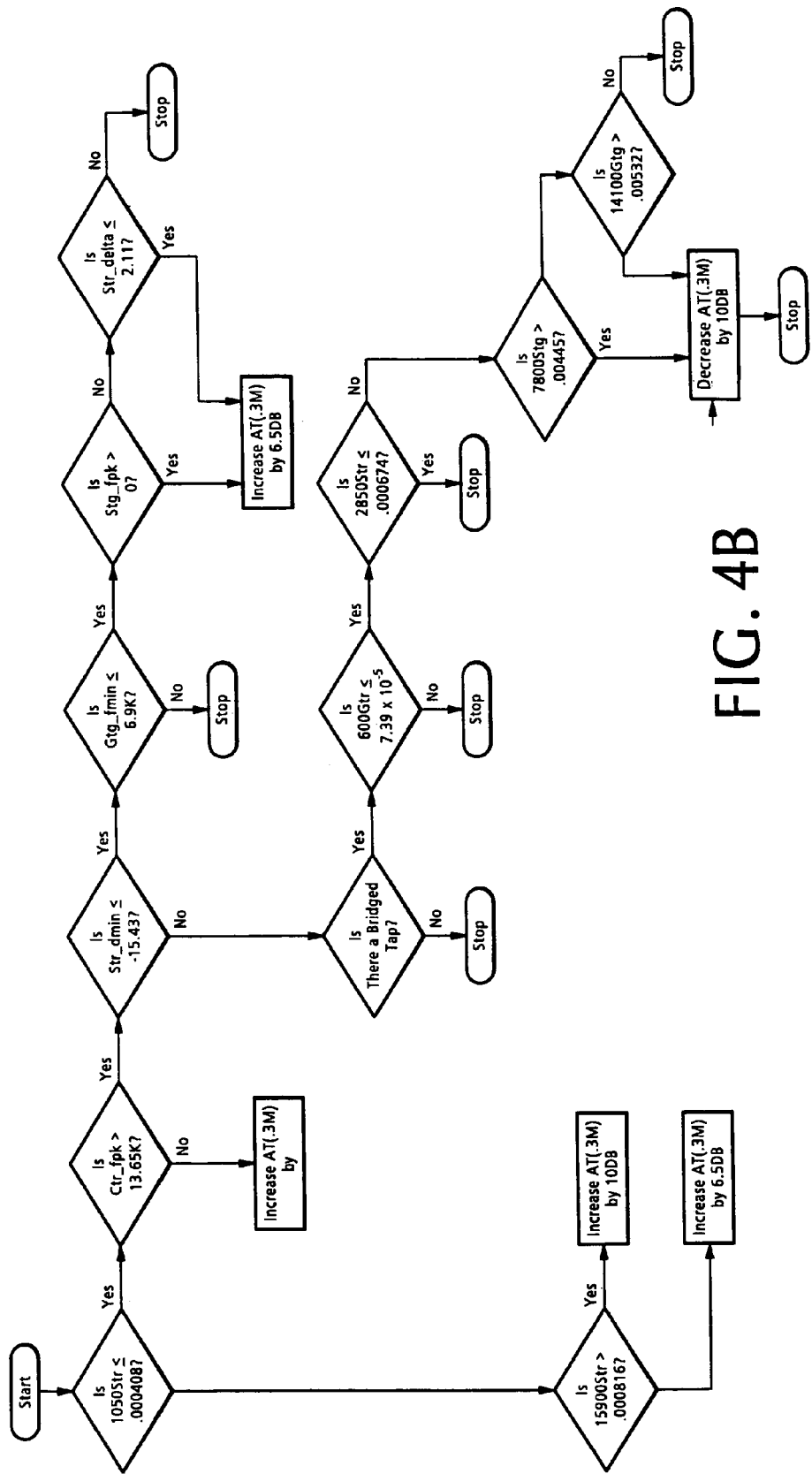
Figure 4C:
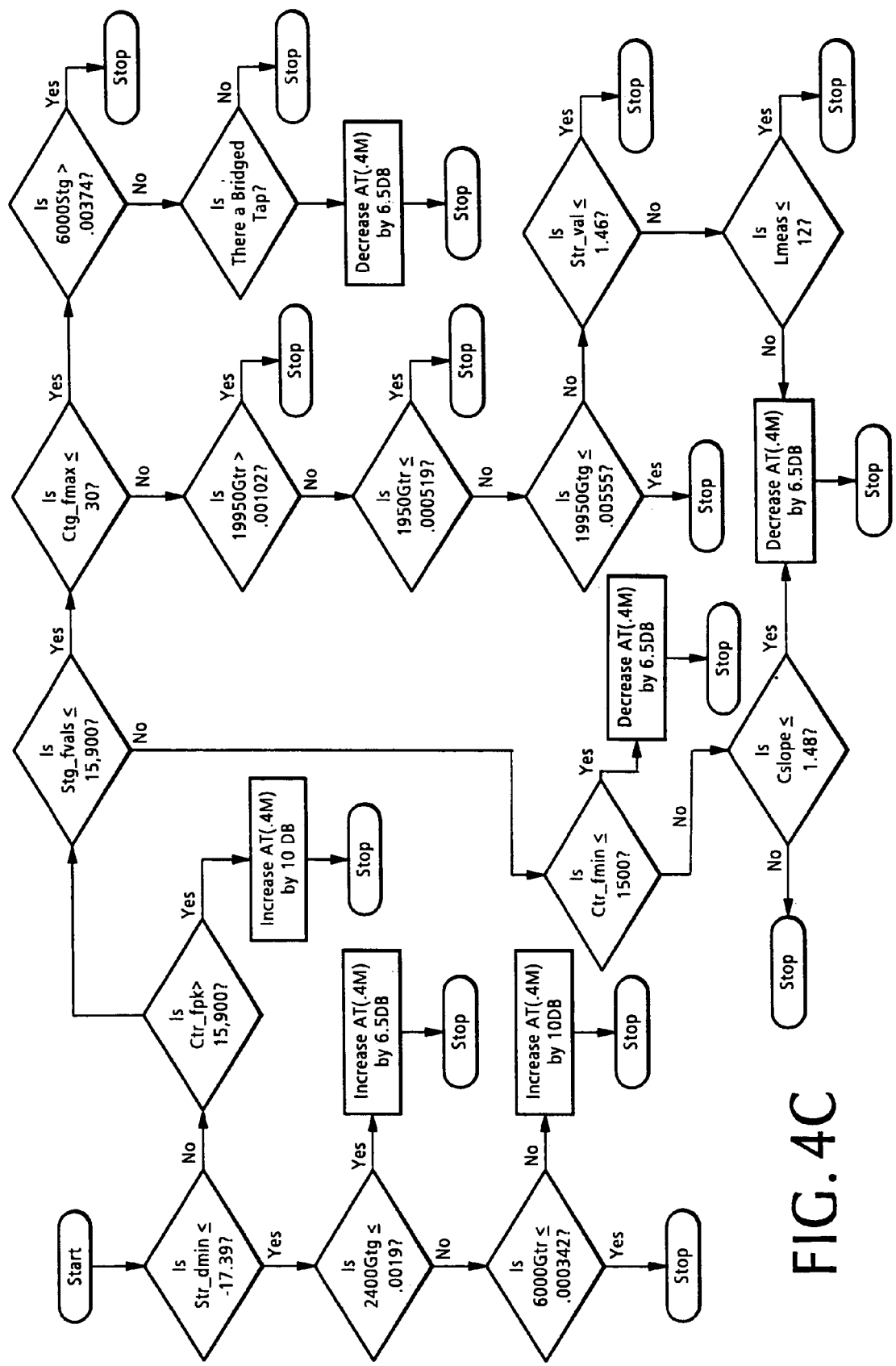
Figure 4D:
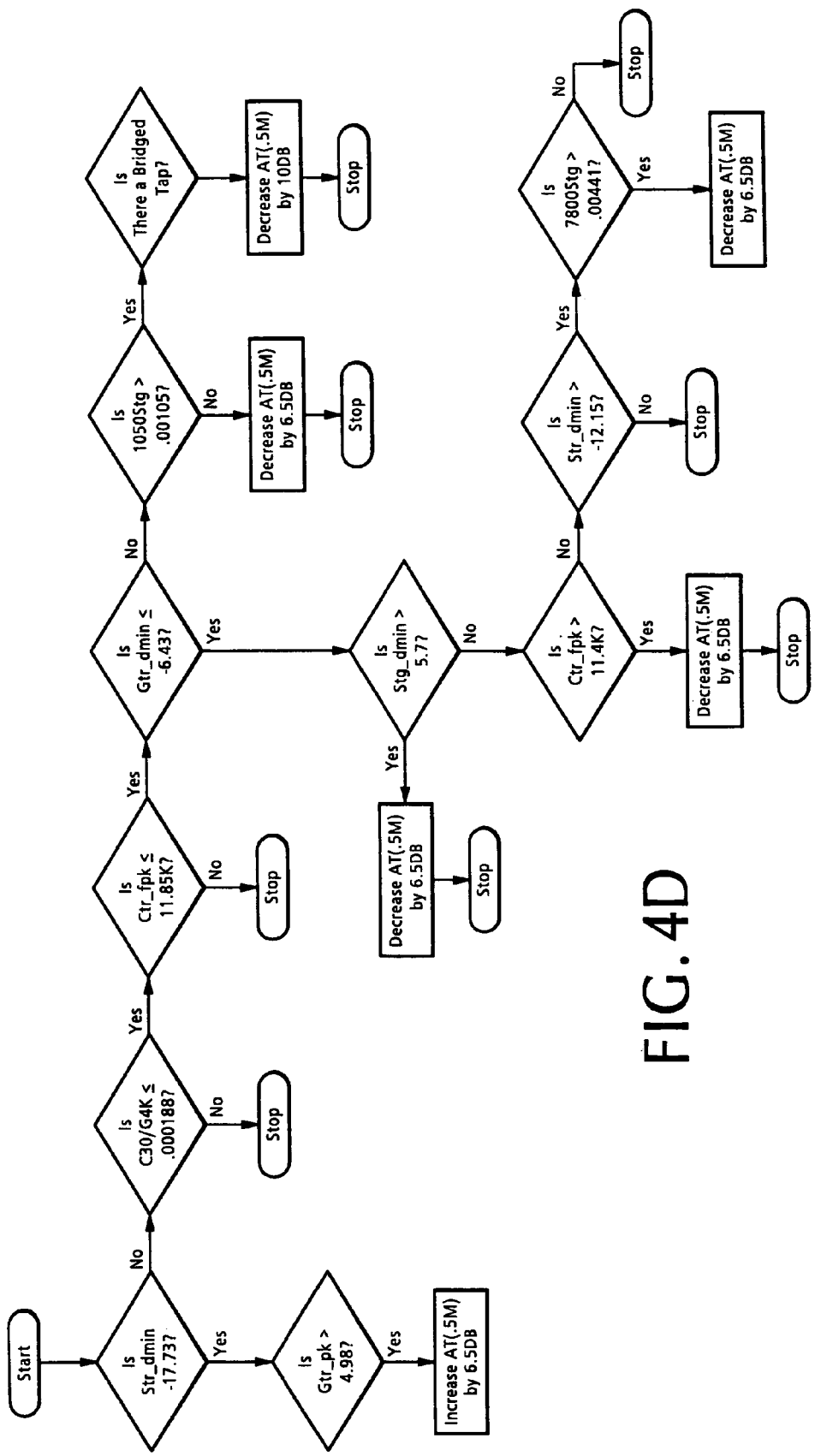

A solid curve 32, shown in FIG. 3, graphically illustrates the equation for AT(f) as a function of frequency. Second, for each customer line, the frequency dependent values of the AT(f) are adjusted using a method found through data mining. The second step produces the attenuation, ATT(f), for each customer line. ATT(f) is generally an improved value of the line's attenuation compared to the AT(f) for an average line. A solid curve 32, shown in FIG. 3, graphically illustrates the equation for AT(f) as a function of frequency.

Second, for each customer line, the frequency dependent values of the AT(f) are adjusted using a method found through data mining. The second step produces the attenuation, ATT(f), for each customer line. ATT(f) is generally an improved value of the line's attenuation compared to the AT(f) for an average line.

Data mining produces a set of logical decision trees, which are used to find ATT(f). For each customer line, the computer 24 of FIG. 1 works through the set of logical decision trees. Each decision tree determines whether or not ATT(f), at one frequency, is shifted from the value of AT(f) at that frequency. At frequencies between those associated with logical decision trees, the computer 24 finds the value of ATT(f) by performing a smooth interpolation. The dashed line 34 of FIG. 3 shows the ATT(f) of one customer line, which was found by the logical decision tree analysis (M=$10^6$, K=$10^3$, and DB=decibels).

FIGS. 4A, 4B, 4C, and 4D are flow charts showing the decision trees for finding the values of ATT(0.1 MHz), ATT(0.3 MHz), ATT(0.4 MHz), and ATT(0.5 MHz), respectively. FIG. 3 shows the ATT(0.1 MHz), ATT(0.3 MHz), ATT(0.4 MH), and ATT(0.5 MHz) (triangles) of one customer line, which were found from the AT(0.1 MHz), AT(0.3 MHz), AT(0.4 MH), and AT(0.5 MHz) values (dots). Each decision tree uses logical tests based on lower frequency derived quantities, which are listed in Table 2. In Table 2, admittances are given in siemens, capacitances are given in Farads, and frequencies are given in Hertz unless otherwise indicated.

TABLE 2

30 Hz Raw Measurements:

Ytr(30) - Admittance tip-to-ring measured at 30 Hz
Ytg(30) - Admittance tip-to-ground measured at 30 Hz
Yrg(30) - Admittance ring-to-ground measured at 30 Hz
30 Hz Derived Measurements:

30 Gtr - Conductance tip-to-ring measured at 30 Hz = real(Ytr(30))
30 Str - Susceptance tip-to-ring measured at 30 Hz = imag(Ytr(30))
30 Gtg - Conductance tip-to-ground measured at 30 Hz = real(Ytg(30))
30 Stg - Susceptance tip-to-ground measured at 30 Hz = imag(Yt(30))
30 Ctr - Capacitance tip-to-ring measured at 30 Hz = Str(30)/(2 * pi * 30)
30 Ctg -
Capacitance tip-to-ground measured at 30 Hz = St(30)/(2 * p1 * 30)
Lmeas - Length in kft measured at 30 Hz = 30 Ctg/17.47
150 Hz-20 KHz Raw Measurements:

Ytr(f) - Admittance tip-to-ring where
f = 150 Hz,600 Hz, 1050 Hz, 1500 Hz, . . . 19950 Hz
Ytg(t) - Admittance tip-to-ground where =
150 Hz, 600 Hz, 1050 Hz, 1500 Hz . . . .19950 Hz
Yrg(f) - Admittance ring-to-ground where
f = 150 Hz, 600 Hz, 1050 Hz, 1500 Hz, . . . 19950 Hz
150 Hz-20 KHz Derived Measurements:

150 Gtr - Conductance tip-to-ring measured at 150 Hz = real(Ytr(150))
600 Gtr - Conductance tip-to-ring measured at 600 Hz real(Ytr(600))
19950 Gtr - Conductance tip-to-ring measured at 19950 Hz =
real Ytr(19950))
150 Str - Susceptance tip-to-ring measured at 150 Hz = imag(Ytr(150))
600 Str - Susceptance tip-to-ring measured at 600 Hz = imag(Ytr(600))
19950 Str - Susceptance tip-to-ring measured at 19950 Hz =
imag(Ytr(19950))
150 Gtg - Conductance tip-to-ground measured at 150 Hz =
real(Ytg(150))
600 Gtg - Conductance tip-to- ground measured at 600 Hz =
real(Ytg(600))
19950 Gtg - Conductance tip-to-ground measured at 19950 Hz =
real(Ytg(19950))
150 Stg - Susceptance tip-to-ground measured at 150 Hz =
imag(Ytg(150))

TABLE 2-continued

600 Stg - Susceptance tip-to-ground measured at 600 Hz = imag(Ytg(600))
19950 Stg - Susceptance tip-to-ground measured at 19950 Hz =
imag(Ytg(19950))
150 Ctr - Capacitance tip-to-ring measured at 150 Hz =
150 Str/(2 * pi * 150)
600 Ctr - Capacitance tip-to-ring measured at 600 Hz =
600 Str/(2 * pi * 600)
19950 Ctr - Capacitance tip-to-ring measured at 19950 Hz =
9950 Str/(2 * pi * 19950)
150 Ctg - Capacitance tip-to-ground measured at 150 Hz =
150 Stg/(2 * pi * 150)
600 Ctg - Capacitance tip-to-ground measured at 600 Hz =
600 Stg/(2 * pi * 600)
19950 Ctg - Capacitance tip-to-ground measured at 19950 Hz =
19950 Stg/(2 * pi * 19950)
150 Hz-20 KHz Secondary Derived Measurements:

C30/C4K - Ratio of tip-to-ground Capacitance at 30 Hz to 4200 Hz
C4K/C10K - Ratio of tip-to-ground Capacitance at 4200 Hz to 10050 Hz
Cslope - Tip-to-ground Capacitance ratio slope = (C4K/C10K)/(C30/C4K)
C30-C4K - Difference in tip-to-ground Capacitance at 30 Hz and 4200 Hz
C4K-C10K -
Difference in top-to-ground Capacitance at 4200 Hz and 10050 Hz
Cdelta - Tip-to-ground Capacitance difference delta =
(C4K-C10K)/(C30-C4K)
G4K-G30 - Ratio of tip-to-ground Conductance at 4200 Hz and 30 Hz
G10K-G4K -
Ratio in tip-to-ground Conductance at 10050 Hz and 4200 Hz
Gslope - Tip-to ground Conductance ratio slope =
(G10K/G4K)/(G4K/G30)
G4K-G30 -
Difference in tip-to-ground Conductance at 30 Hz and 4200 Hz
G10K-G4K -
Difference in tip-to-ground Conductance at 4200 Hz and 10050 Hz
Gdelta - Tip-to-ground Conductance difference delta =
(G10K-G4K)/(G4K-G30)
C30/G30 - Ratio of Tip-to-ground Capacitance to Conductance at 30 Hz
C30/G4K -
Ratio of Tip-to-ground Capacitance at 30 Hz to Conductance at 4200 Hz
C4K/G4K -
Ratio of Tip-to-ground Capacitance to Conductance at 4200 Hz
Gtr_dmax - Maximum positive slope of Gtr(f) =
max(derivative(Gtr(f)/df)
Gtr_fmax - Frequency at which Gtr_dmax occurs
Gtr_dmin - Maximum negative slope of Gtr(f) =
min(derivative(Gtr(f)/df))
Gtr_fmin - Frequency at which Gtr_dmin occurs
Gtr_fpk - Frequency of first peak (local maxima)in Gtr(t)
Gtr-fval - Frequency of first valley(local minima)in Gtr(t)
Gtr_d_delta - Gtr Max/Mm Derivative difference =
Gtr_dmax-Gtr_dmin
Gtr_pk_delta - Gtr peak/valley frequency difference = Gtr_fval-Gtr_fpk
Gtr_pk - Value of Gtr(f) at frequency Gtr_fpk
Gtr_val - Value of Gtr(f) at frequency Gtr_fval
Gtr_delta - Gtr peak/valley difference = Gtr_pk-Gtr_val
Gtg dmax - Maximum positive slope of Gtg(f) =
max(derivative(Gtg(f)/df))
Gtg_fmax - Frequency at which Gtg dmax occurs
Gtg_dmin - Maximum negative slope of Gtg(f) =
min(derivative(Gtg(f)/df))
Gtg_fmin - Frequency at which Gtg dmin occurs
Gtg_d_delta - Gtg Max/Min Derivative difference =
Gtg_dmax-Gtg_dmin
Ctr_dmax - Maximum positive slope of Ctr(f) =
max(derivative(Ctr(f)/df)
Ctr_fmax - Frequency at which Ctr_dmax occurs
Ctr_dmin - Maximum negative slope of Ctr(f) = min(derivative(Ctr(f)/df))
Ctr_fmin - Frequency at which Ctr_dmin occurs
Ctr_fpk Frequency of first peak (local maxima)in Ctr(f)
Ctr_fval - Frequency of first valley(local minima)in Ctr(f)
Ctr_d_delta - Ctr Max/Mm Derivative difference = Ctr_dmax-Ctr_dmin
Ctrpk delta - Ctr peak/valley frequency difference = Ctr_fval-Ctr_fbk
Ctr_val - Value of Ctr(f) at frequency Ctr_fval
Ctg_dmax - Maximum positive slope of Ctg(f) =
max(derivative(Ctg(f)/df))
Ctg_fmax - Frequency at which Ctg dmax occurs
Ctg_dmin - Maximum negative slope of Ctg(f) =
min(derivative(Ctg(f)/df))

TABLE 2-continued

Ctg_fmin - Frequency at which Ctg dmin occurs
Ctg_d_delta - Ctg Max/Min Derivative difference = Ctg_dmax-Ctg_dmin
Str_dmax - Maximum positive slope of Str(f) = max(derivative(Str(f)/df))
Str_fmax - Frequency at which Str_dmax occurs
Str_dmin - Maximum negative slope of Str(f) = min(derivative(Str(f)/df))
Str_fmin - Frequency at which Str_dmin occurs
150 Hz-20 Hz Secondary Derived Measurements:

Str_fpk - Frequency of first peak (local maxima)in Str(f)
Str_fval - Frequency of first valley(local minima)in Str(f)
Str_d_delta - Str Max/Mm Derivative difference = Str_dmax-Str_dmin
Str_pk_delta - Str peak/valley frequency difference = Str_fval-Str_fpk
Str_pk - Value of Str(f) at frequency Str_fpk
Str_val - Value of Str(f) at frequency Str_fval
Str_delta - Str peak/valley difference = Str_pk_Str_val
Stg_dmax - Maximum positive slope of Stg(f) = max(derivative (Stg(f)/df))
Stg_fmax - Frequency at which Stg_dmax occurs
Stg_dmin - Maximum negative slope of Stg(f) = min(derivative (Stg(f)df))
Stg_fmin - Frequency at which Stg_dmin occurs
Stg_fpk - Frequency of first peak (local maxima)in Stg(t)
Stg_fval - Frequency of first valley(local mixima)in Stg(f)
Stg_d_delta - Stg Max/Min Derivative difference = Stg_dmax-Stg_dmin
Stg_pk_delta - Stg peak/valley frequency difference Stg_fval-Stg_fpk
Gtg20k/Gtg8k - Ratio of Gtg at 19950 Hz and 8250 Hz
Gtg20k/Gtg4k - Ratio of Gtg at 19950 Hz and 4200 Hz
Cgt30/Cgt20k - Ratio of Ctg at 30 Hz and 19950 Hz
Cgt30/Cgt8k - Ratio of Ctg at 30 Hz and 8250 Hz The result from each decision tree provides a value of ATT(f) at a higher frequency than the frequency used to measure the admittances $Y_{tg}$, $Y_{tr}$, and $Y_{rg}$. Thus, the logical decision trees enable the computer 24 to improve ATT(f) for each customer line, at frequencies higher than the frequencies at which measurements are performed on the line.

From a line's attenuation ATT(f), the computer 24 can derive a normalized line length (NLL). NLL(f) is the equivalent length of 26 gauge twisted copper telephony line to produce the attenuation ATT(f). The value of NLL(F) is approximately:

$$NLL(f)=ATT(f)/\{\Sigma^{7}_{j=0}P_j(\log(f)^j\} \text{ where the } P_j \text{ are:}$$

($P_0$, ., ., ., $P_7$)=$10^3$(−1.81718846839515,
2.3122218679438, −1.25999060284948,
0.38115981179243, −0.06912909837418,
0.00751651855434, −0.00045366936261,
0.00001172506721)

Averaging NLL(f) over frequencies between 100 KHz and 1 Mhz provides an averaged normalized line length. The averaged normalized line length and a normalized noise define properties of a line model for the measured customer line 12–14, which allow the prediction of data transmission rates.

The one-ended measurements on the selected customer line 12–14 also include noise power spectra and impulse noise. Noise power spectra are determined directly through one-ended measurements using a spectrum analyzer (not shown) located in the measurement unit 22. Impulse noise measurements employ a differential comparator (not shown) also located in the switch 15. The comparator has an adjustable threshold and produces a digital output pulse for each above-threshold spike on the tip or ring T, R wires. The output digital signal goes to a counter (not shown), which sums the number of counts to produce a rate for above-threshold noise impulses.

Noise measurements may both disqualify and correct predicted data rates of the lines 12–14 being qualified. For high noise levels, synchronization of the line 12–14 for ADSL or ISDN data transmissions becomes impossible, and the noisy line 12–14 must be disqualified. For example, impulse noise rates above about five 150 millivolt-counts-per-second disqualify a line for ADSL transmissions. When noise is not a disqualifier, it still can lower the predicted data rates for the customer line in a manner that generally depends on the modem used with the selected line 12–14.

Referring again to FIG. 1, the customer lines 19, 21 do not connect to the switch 15 and thus, cannot be automatically tested by the measurement unit 22. Thus, speed qualification or disqualification of these lines 19, 21 requires indirect measurements henceforth referred to "proxy measurements".

Proxy measurements are one-ended electrical measurements on a "proxy" line located in the same cable 23 as the unconnected line 19, 21 to be qualified or disqualified. The proxy line connects to the switch 15 and thus, can be tested by one-ended electrical measurements made from the switch 15. For example, the line 14 is a potential proxy line for the line 19 going to the same customer.

The proxy line 14 is located in the same cable 23 as the unconnected lines 19, 21 to be qualified. Thus, both types of lines have undergone the same handling after fabrication of the cable 23. Similarly, if the cable 23 has more than 12 different customer lines, e.g., a standard telephony cable, the various lines 12–14, 19, 21 are in very similar cable environments. Then, electrical measurements on the proxy line 14 can, in some cases, provide a reliable measure of the same electrical properties for the unconnected lines 19, 21. The reliability of proxy measurements may further increase if the proxy line goes to the same residence as the unconnected line, e.g., lines 14 and 19. But, proxy measurements may still be reliable if the proxy line is simply in the same cable 23, e.g., the line 13 as a proxy for the line 19.

Line Performance Predictions

Figure 5:
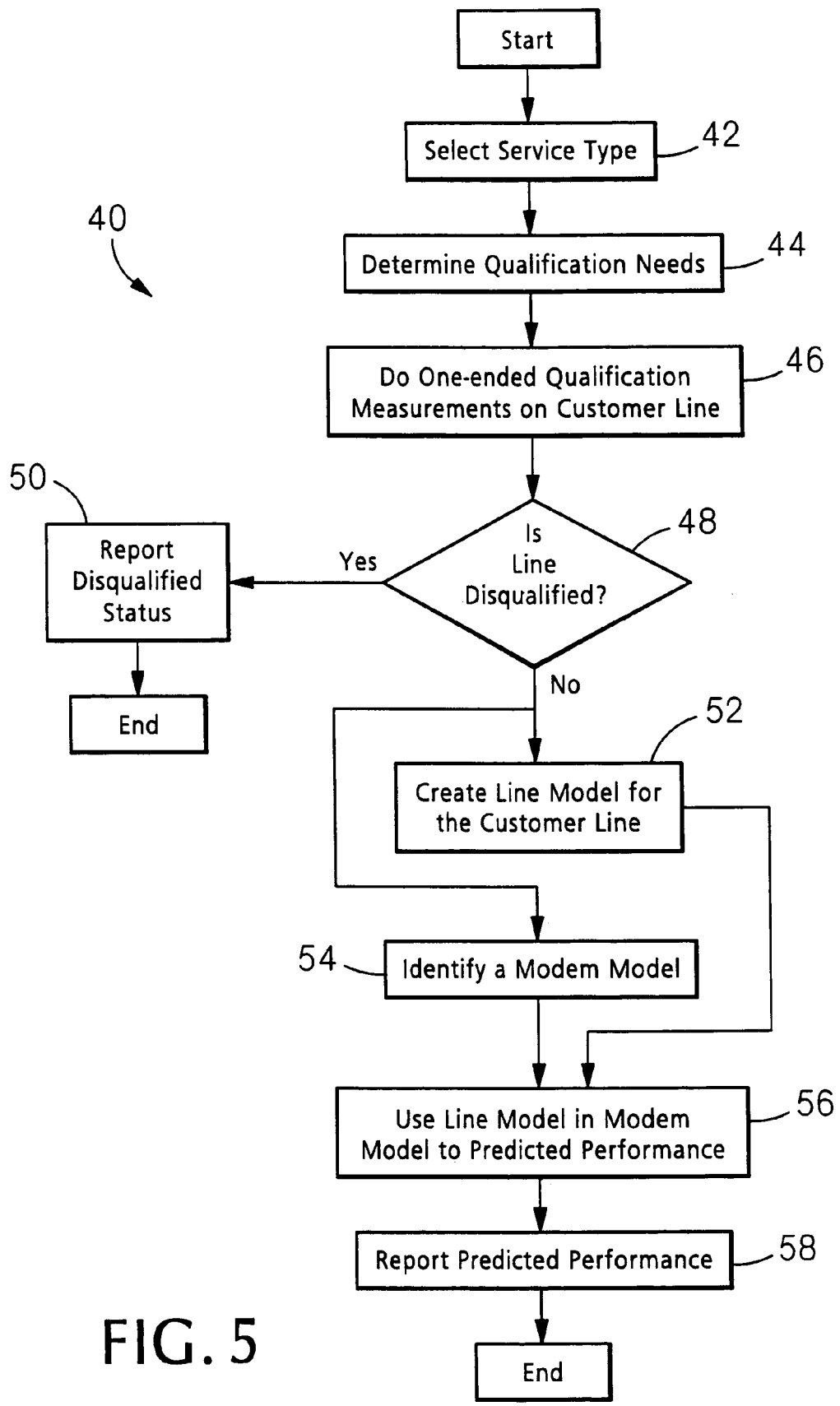
FIG. 5 is a flow chart illustrating a method for speed qualifying a customer line for data transmission.

FIG. 5 is a flow chart illustrating a method 40 of speed qualifying or disqualifying a selected one of the customer lines 12–14 of FIG. 1 for data transmissions. The method has two parts. In a first part, the computer 24 and measurement unit 22 of FIG. 1 rapidly determine whether the selected line 12–14 is pre-disqualified for data transmissions. In the second part, the computer 24 predicts the speed for data transmissions if the selected line 12–14 is not disqualified in the first part.

To determine whether the selected customer line 12–14 is disqualified for transmitting data, the computer 24 or an operator selects the type of data service to be implemented on the selected customer line 12–14 (step 42). Next, the computer 24 determines the qualification requirements for the selected type of data service on the selected line 12–14 (step 44). Next, the computer 24 and measurement unit 22 perform one-ended electrical measurements on the selected customer line (step 46). Then, the computer 24 determines from the one-ended measurements whether the selected customer line 12–14 is disqualified for the selected type of data transmissions (step 48). If the selected customer line 12–14 is disqualified, the computer reports the disqualification status and stops.

The pre-disqualification part of the method 40 is generally more rapid than predicting the actual data rates obtainable. U.S. Provisional Application 60/106,845, filed Nov. 3, 1998, now U.S. Pat. No. 6,385,297 B2, provides detailed account of some types of measurements and determinations performed in pre-disqualification steps 42, 44, 46, 48.

The Disqualification method allows a telephone company to test its subscriber lines to determine which lines may support data transmission, and to disqualify those lines which do not. Under the Disqualification method, the test system controller 24 gathers several factors about the subscriber line which may, for example, include: (1) using any known technique to determine the length of the line; (2) using any known technique to determine the magnitude of any DC metallic faults present on the line; (3) using any known technique to determine the capacitive balance of the line; (4) using any known technique to detect the presence of load coils on the line, such as the one described in U.S. patent application Ser. No. 08/929,842 by Yun Zhang entitled "Fast and Noise-Insensitive Load Status Detection" which is hereby incorporated by reference; (5) using any known technique to determine the composite noise on the line; and (6) using the technique described below to determine the resistive balance on the line. A line may be disqualified by using less than all of these techniques or by using other or additional checks.

The test system controller 24 then executes rules, using the appropriate hardware and software, to determine whether a line should be disqualified for data transmissions. Examples of rules that may be used to disqualify a line include:

That the line length is greater than some threshold, preferably in the range of 4 to 6 kilometers, and more preferably 5.5 kilometers; or That metallic faults are less than some threshold, preferably in the range of 80 to 200 kilo-ohms, and more preferably 100 kilo-ohms; or That capacitive imbalance is greater than some threshold, preferably in the range of 0 to 5% and more preferably greater than 0%; or That load coils are detected; or That noise is greater than some threshold, which is preferably empirically determined; or That resistive imbalance is greater than some threshold, preferably in the range of 0 to 50% or that the series resistive imbalance is unstable, meaning that the measured series resistance imbalance changes more than some threshold since a reference measurement was made.

It will be appreciated that not all of these measurements might need to be made to disqualify a line. Further, it should be appreciated that the thresholds used for each test might be different, depending on the type of data service. For example, ISDN data service can operate at a lower error rate than V.90 at a given level of instability in the series resistive imbalance. It is contemplated that the thresholds will be empirically determined, taking into account such factors as actual experience and the acceptable bit error rate specified by the user or other factors.

Steps 42, 44, 46, and 48 may also include further tests specific to the type of termination at the customer units 16–18. For example, for ADSL-lite data transmissions the fact that a customer unit 16–18 attenuates high frequencies could be used as a disqualifier test.

If the selected customer line 12–14 is not pre-disqualified at step 48, the computer 24 will predict the data rate of the selected line 12–14 for data transmissions. First, the computer 24 creates a line model for the selected customer line 12–14, e.g., by performing more one-ended measurements on the line 12–14 and deriving the line model therefrom (step 52). At substantially the same time, the computer 24 identifies a modem model to be used with the selected customer line 12–14 (step 54). The modem model may correspond to the modem in the central office 20 and/or the modem at the customer's residence. Next, the computer 24 uses the line model for the selected customer line 12–14 in the modem model to predict the line's performance, e.g., the data rate. Some modem models are a data file stored in the computer 24 and indexed by properties of the line model. Finally, the computer 24 reports the line performance when used with the identified modem (step 58).

Figure 6:
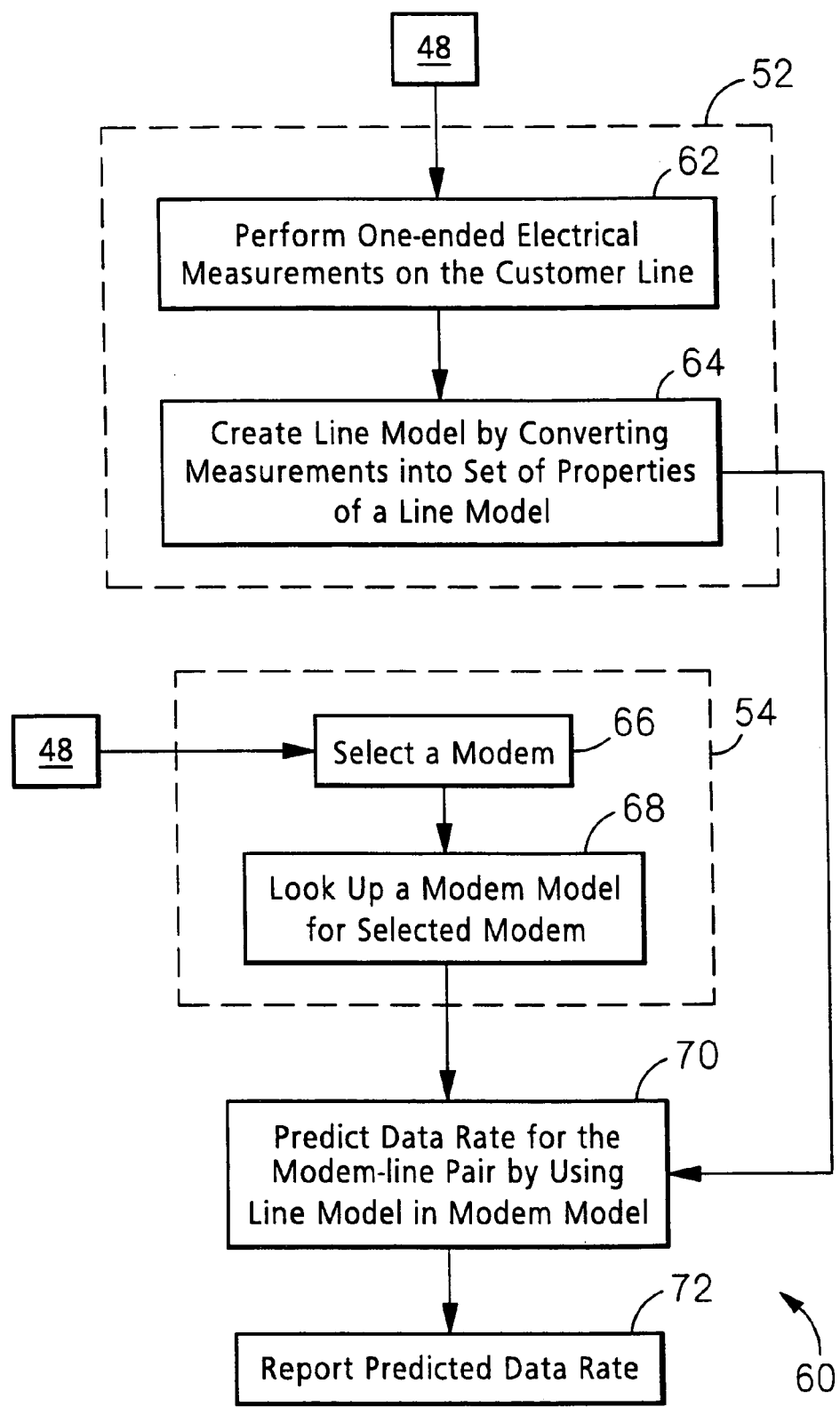
FIG. 6 is a flow chart illustrating a method for predicting the data rate of a line in the method of FIG. 5.

FIG. 6 is a flow chart illustrating a method 60 for predicting the performance of the selected customer line 12–14, which was not pre-disqualified for data transmissions at step 48 of FIG. 5. The computer 24 and measurement unit 24 control one-ended electrical measurements carried out by apparatus 27 on the twisted pair T and R of the selected customer line 12–14 (step 62). The measurements determine the three admittances $Y_{tg}$, $Y_{tr}$, $Y_{rg}$ of the tip and ring wires T, R and the noise levels in the selected customer line 12–14. Next, the computer derives a number of other properties of the selected customer line 12–14 from the one-ended measurements (step 64). As discussed above, the derived properties may include a line length, the existence or absence of one or more bridged taps, the gauge mix of the line, impulse noise level, frequency dependent attenuation, normalized line length, and the noise spectrum.

From these derived properties, the computer 24 calculates a second-level derived property—the average normalized line length. The average normalized line length is the length of 26 gauge paired twisted copper wires, located in a telephony cable 23 with at least 12 other twisted wire pairs, which would have substantially the same transmission properties.

The computer 24 also selects a modem, e.g., in response to a customer's request or a TELCO's command to speed qualify or disqualify the line for a particular modem type (step 66). Next, the computer 24 looks up a modem model for the selected modem in a database (step 68). The modem model is a table of performance data, i.e., data transmission rates, indexed by the averaged normalized line length and the line noise level. The computer 24 may leave the modem model in active memory while waiting for data on the line model associated with the selected customer line 12–14. Next, the computer uses the line model data in the modem model to find a predicted data rate for the selected modem in association with the selected customer line 12–14 (step 70). Finally, the computer 24 reports the predicted data rate to the customer or to a readable storage device (step 72).

Figure 7:
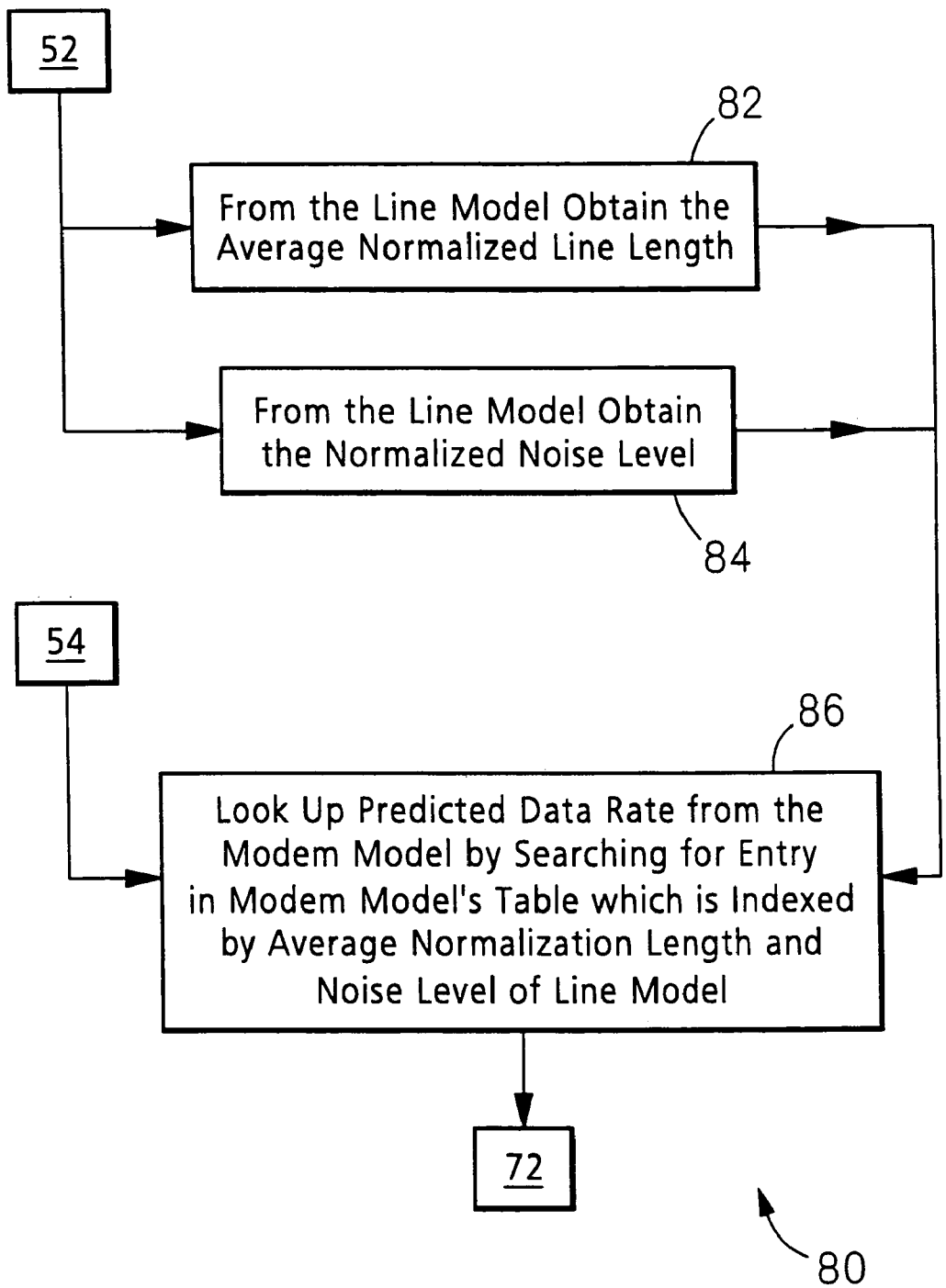
FIG. 7 is a flow chart illustrating a method for predicting the data rate from line and modem models.

FIG. 7 is a flow chart illustrating one method for predicting the data rate of the selected customer line 12–14 as shown in step 70 of FIG. 6. The line model is either a set of rules or a file for the properties characterizing the model. From the line model, the computer 24 reads the average normalized line length (step 82). Similarly, the line model or one-ended measurements determine a normalized noise level associated with the selected customer line 12–14 (step 84). Finally, the computer 24 performs a look up of a predicted data rate in a table defining the modem model (step 86). The modem model's table is indexed by the averaged normalized line length and the normalized noise level. The table is a tabular form representing the modem model for the modem to be used with the selected customer line 12–14.

Figure 8:
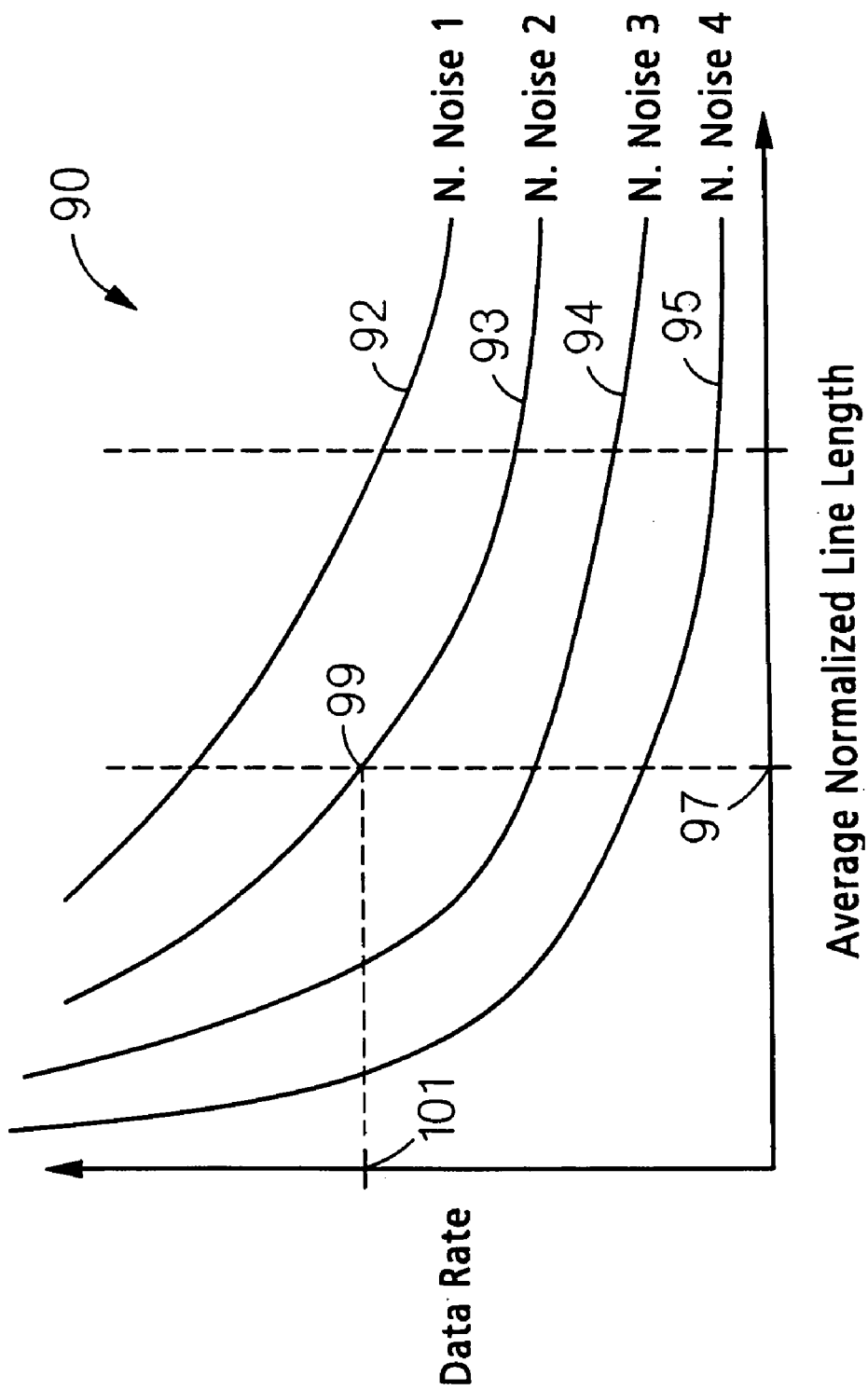
FIG. 8 is a graphical representation of the method of FIG. 6 for a modem model in which the data rate depends on the line's normalized noise level and average normalized line length.

FIG. 8 graphically illustrates one modem model 90 as a set of curves 92–95 for the predicted data rate. The values from the curves 92–95 depend on, i.e., are indexed by, a line's normalized noise level and averaged normalized line length. The separate curves 92–95 give the predicted data rate for four values of the normalized noise level of the line model. Each curve 92–95 is also dependent on the averaged normalized line length, which is plotted along the horizontal axis.

The predicted data rate can be obtained from the modem model 90 of FIG. 8 by performing a look up with the parameters of the line model. To predict the data rate, the computer 24 looks up one of the curves 92–95 using the normalized noise value from the line model, e.g., normalized noise value 2. Next the computer 24 finds the predicted value of the data rate by looking up the averaged normalized line length, given by the line model, on the horizontal axis, e.g., value 97. The value 101 of curve 93 at the intersection 99 with the value 97 of the averaged normalized line length is the predicted data rate. In the described embodiment, the computer does the look ups in a data base indexed by the normalized noise level and the average normalized line length instead of graphically.

Some modem models also depend on parameters such as impulse noise compensation, noise floor, echo compensation and phase instability compensation. The impulse noise compensation is the ability of the modem to resynchronize or to remain synchronized in the presence of impulse noise on the customer line. The noise floor is the noise level below which the modem does not resolve data signals. The echo compensation is the ability of the modem to compensate for reflected signals in the customer line. The phase instability compensation is the ability of the modem to compensate for time-dependent imbalances in the customer line, e.g., time-dependent reflections.

Using the values of each of these parameters, the computer 24 of FIG. 1 adjusts the predicted data rate from the rate predicted by FIG. 8. The modem models attach a figure-of-merit or quality rating to each of the above parameters. For each parameter, the quality rating may, for example, be excellent, good, or bad. The quality ratings determine whether the predicted data rate, e.g., the rate from FIG. 8, is adjusted up, down or not adjusted by the computer 24 to obtain a final predicted data rate. For example, some embodiments adjust the predicted data rate from FIG. 8 up by 10 percent and down by 10 percent for quality ratings of excellent and bad, respectively.

Similarly, some line models include a gauge mix parameter, which is given a quality rating, i.e., high, average, or low. Data mining techniques can be used to infer a test for the gauge mix of a line from the one-ended electrical measurements. The computer 24 of FIG. 1 adjusts the predicted data rate from the rate predicted by FIG. 8 according to the quality rating of the gauge mix.

Figure 9:
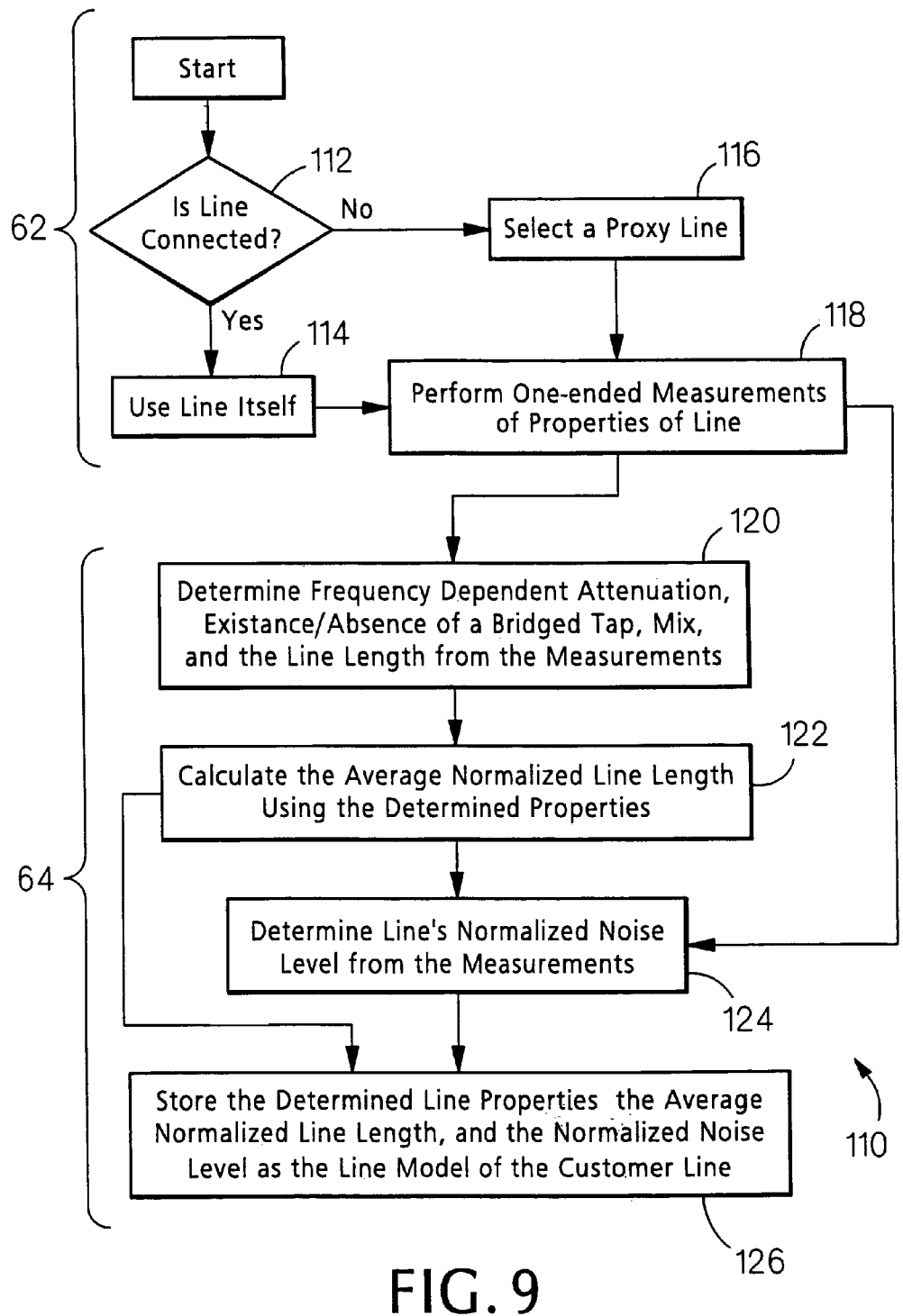
FIG. 9 is a flow chart illustrating a method of finding a line model from one-ended measurements.

FIG. 9 is a flow chart illustrating a method 110 of finding a line model for any selected customer line 12–14, 19, 21, i.e. either connected or unconnected to the switch 15 of FIG. 1. First, the computer 24 determines whether the selected line is connected to the switch 15 (step 112). If the selected line is connected, the computer 24 chooses the selected line itself for one-ended electrical measurements (step 114). If the selected line is unconnected, e.g., the lines 19, 21 of FIG. 1, the computer 24 chooses a proxy line in the same cable 23 for the one-ended electrical measurements (step 116). Next, the computer 24 and measurement unit 22 perform the one-ended measurements of the chosen line's admittances $Y_{tg}$, $Y_{tr}$, $Y_{rg}$ and noise levels as described above (step 118). Next, the computer 245 determines the above-described derived properties for the chosen line from the measured admittances and noise levels as described above (step 120). The derived properties include the frequency dependent attenuation, the absence or existence of a bridged tap, the mix, the frequency-dependent normalized line length, and the averaged normalized line length. From the derived properties, the computer 24 determines the averaged normalized line length using the formula described below (step 122). Similarly, from the measured noise levels of the chosen line, the computer 24 determines the chosen line's normalized noise level. The computer 24 stores the one-ended measurements, the derived electrical properties (step 120), normalized noise level (step 124), and averaged normalized line length (step 122) as the line model for the originally selected line 12–14, 19, 21 (step 126). These stored quantities form a footprint that characterizes the customer line.

The footprint is stored data on the condition of the line when operating well. Later, the computer 24 can call up the footprint to perform speed path testing. When called up, the footprint is useful for fault detection as described in U.S. Pat. No. 5,699,402, which is herein incorporated by reference in its entirety.

The derived properties characterizing the selected customer line 12–14 and modem models used by the methods of FIGS. 4A–4D are found through methods referred to as "data mining". Data mining produces derived properties that are well correlated with the data produced by the models, e.g., high frequency attenuation.

Figure 10:
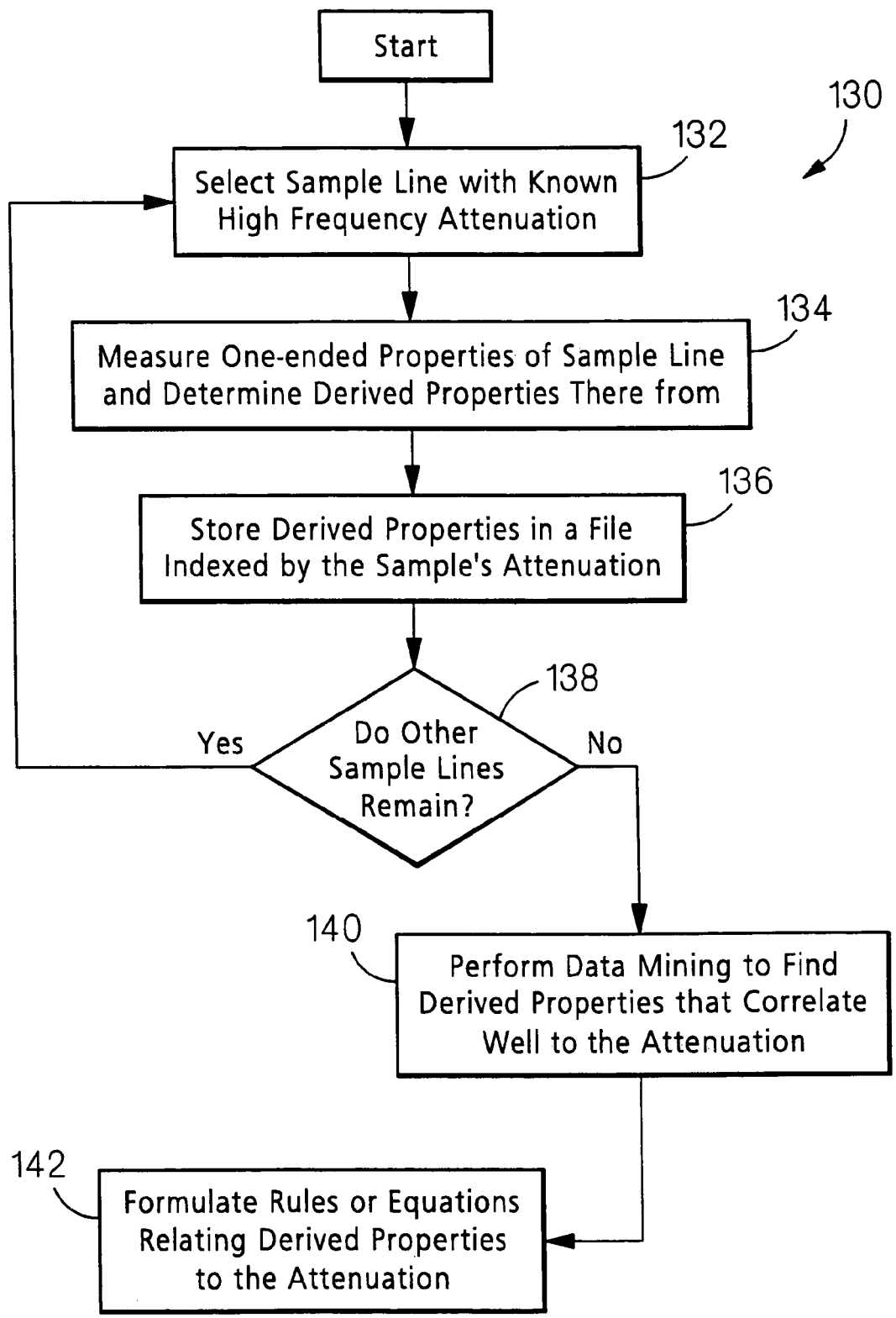
FIG. 10 is a flow chart illustrating the use of data mining to derive rules relating the line attenuation to one-ended measurements.

FIG. 10 illustrates a method 130 for using data mining to find derived properties correlating well with the high frequency attenuation. Data mining starts by selecting a sample line having a known attenuation from a sample pool (step 132). Next, one-ended measurements are performed on the selected sample line and a selected set of derived properties, e.g., low frequency admittances, are found from the measurements (step 134). Next, the values of the selected derived properties are stored in a file indexed by the attenuation of the sample line (step 136). Next, the data mining system determines whether other sample lines remain (step 138). If sample lines remain, the system repeats steps 132, 134, 136, and 138. Otherwise, the system compares the values of the derived properties for the sample lines to determine which properties or sets of properties correlate well with the attenuation (step 140). Finally, the system uses the values of the derived properties correlating well to formulate a set of rules, which determine the attenuation in terms of the well-correlating derived properties (step 142). The "rules" are represented by the methods of FIGS. 4A–4D.

Figure 11:
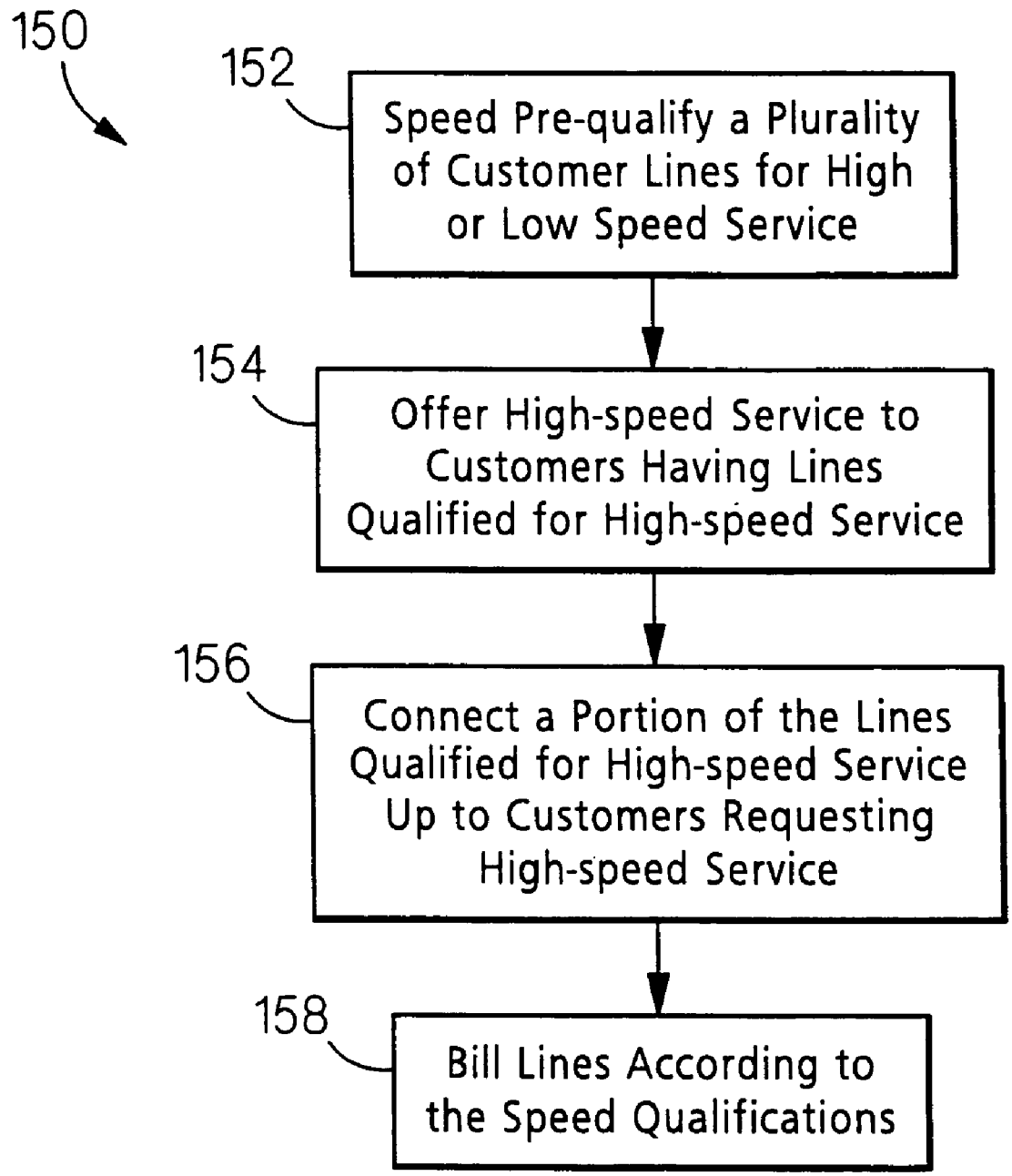
FIG. 11 is a flow chart illustrating a method of marketing telephone lines for data transmission.

FIG. 11 is a flow chart illustrating a method of marketing customer lines for data transmission. First, the computer 24 of FIG. 1 speed pre-qualifies a plurality of the lines 12–14, 19, 21 using one-ended electrical measurements and speed qualification methods described above (step 152). The speed pre-qualification, at least, classifies each line for either high-speed service or low speed service. Next, the TELCO offers high-speed service to a portion of the customers who have lines qualified for the high-speed service (step 154). Next, the TELCO selectively connects at least a portion of the lines qualified for high-speed service to customers requesting the high-speed service (step 156). The TELCO also sets billing rates for, at least, a portion of the lines at prices that depend on the speed qualification (step 158).

Other embodiments are within the scope of the following claims.

What is claimed is:

1. A method of making a qualification decision on a subscriber line connected through a switch, the method comprising:
   a) connecting a measurement unit to the subscriber line through the switch;
   b) making one-ended measurements with the measurement unit of parameters of the subscriber line in a first frequency range;

c) deriving, based on the one-ended measurements, a representation of attenuation by the line of signals in a second, higher frequency range; and d) making a qualification decision on the suitability of the subscriber line to carry high speed data services based on the representation of attenuation by the line.

2. The method of claim 1, wherein making one-ended measurements comprises making measurements at a plurality of frequencies in the first frequency range.

3. The method of claim 1, wherein making one-ended measurements comprises measuring an admittance of the line.

4. The method of claim 3, wherein the line comprises a tip wire and a ring wire and measuring admittance comprises measuring tip to ring admittance, tip to ground admittance and ring to ground admittance.

5. The method of claim 1, additionally comprising using the representation of attenuation to predict a data rate the line can support.

6. The method of claim 1, wherein making a qualification decision comprises determining that the subscriber line is qualified for providing high speed data services.

7. The method of claim 6, wherein making a qualification decision comprises determining that the subscriber line is qualified for providing DSL service.

8. The method of claim 6, additionally comprising using the subscriber line to carry a high speed data service operating over a frequency range that includes 0.5 MHz.

9. The method of claim 6:
a) additionally comprising analyzing the one-ended measurements to determine whether the subscriber line has a configuration that disqualifies the line from providing high speed data services; and
b) the act of making the qualification decision is performed selectively when the act of analyzing the one-ended measurements results in a determination that the subscriber line is not disqualified.

10. The method of claim 9, wherein determining whether the subscriber line has a configuration that disqualifies the line comprises determining whether the line has a length in excess of a threshold, the threshold being in excess of 4 kilometers.

11. The method of claim 1, wherein making a qualification decision comprises determining that the subscriber line is disqualified from providing high speed data services.

12. The method of claim 1, wherein the switch comprises a DSLAM and connecting a measurement unit to the subscriber line comprises connecting the measurement unit through the DSLAM.

13. A method of pre-qualifying one of a plurality of subscriber lines connected to a voice switch using the method of claim 1, the method comprising:
a) selecting one of the plurality of subscriber lines; and
b) making a qualification decision on the selected subscriber according to the method of claim 1.

14. The method of claim 1, wherein deriving a representation of attenuation by the line of electrical signals in a second, higher frequency range comprises predicting the attenuation of an average line over the second frequency range and adjusting the prediction based on the measurements made on the line.

15. The method of claim 1, wherein the second, higher frequency range spans frequencies including 0.1 MHz to 0.5 MHz.

16. The method of claim 1, additionally comprising measuring noise levels on the line and making a qualification decision comprises making a qualification decision based on the representation of attenuation of the line and the measured noise level.

17. A computer program having computer-executable instructions adapted for performing a method of making a qualification decision on a subscriber line connected to a switch in a telephony system having a measurement unit, the method comprising:
a) generating a control signal to cause the switch to connect the measurement unit to the subscriber line;
b) generating a control signal to cause the measurement unit to make one-ended measurements of parameters of the subscriber line in a first frequency range;
c) deriving, based on the one-ended measurements, a representation of line insertion loss of the line in a second, higher frequency range; and
d) making a qualification decision on the suitability of the subscriber line to carry high speed data services based on the representation of line insertion loss of the line in the second frequency range.

18. The computer program of claim 1, wherein making one-ended measurements comprises making measurements at a plurality of frequencies in the first frequency range.

19. The computer program of claim 1, wherein making one-ended measurements comprises measuring an admittance of the line.

20. The computer program of claim 1, wherein the computer program further comprises computer-executable instructions for using the representation of line insertion loss to predict a data rate the line can support.

21. The computer program of claim 20, wherein making a qualification decision comprises determining that the subscriber line is qualified for providing high speed data services.

22. The computer program of claim 21, wherein making a qualification decision comprises determining that the subscriber line is qualified for providing DSL service.

23. The computer program of claim 21, further comprising computer-executable instructions for analyzing the one-ended measurements to determine whether the subscriber line has a configuration that disqualifies the line from providing high speed data services; and wherein the computer program is configured to execute the computer-executable instructions for making the qualification decision selectively when the act of analyzing the one-ended measurements results in a determination that the subscriber line is not disqualified.

24. The computer program of claim 20, wherein making a qualification decision comprises determining that the subscriber line is disqualified from providing high speed data services.

25. The computer program of claim 20, adapted to operate when the switch comprises a DSLAM.

26. The computer program of claim 20, wherein deriving a representation of line insertion loss in a second, higher frequency range comprises predicting the attenuation of an average line over the second frequency range and adjusting the prediction based on the measurements made on the line.

27. The computer program of claim 20, wherein the second frequency range spans frequencies including 0.1 MHz to 0.5 MHz.

28. The computer program of claim 20, adapted for use with a measurement unit capable of measuring noise levels on the line and wherein the computer-executable instructions for making a qualification decision comprise computer-executable instructions for making a qualification decision based on the representation of attenuation of the line and the measured noise level.

29. A telephony system comprising:
a) a switch;
b) a plurality of lines connected to the switch;
c) a measurement unit connected to the switch, the measurement unit switchably connected through the switch to each of the plurality of lines;
d) a controller, coupled to the measurement unit, the controller comprising a computer program having computer-executable instructions for performing acts of:
   i) receiving from the measurement unit one-ended measurements on a selected one of the plurality of lines, the measurements made in a first frequency range;
   ii) deriving, based on the one-ended measurements in the first frequency range, a parameter representing the effect of the selected one of the plurality of lines on electrical signals in a second, higher frequency range; and
   iii) making a qualification decision on the suitability of the selected one of the plurality of lines to carry data services using signals in the second frequency range based on the parameter.

30. The telephony system of claim 29, wherein the one-ended measurements comprise measurements at a plurality of frequencies in the first frequency range.

31. The telephony system of claim 29, wherein the one-ended measurements comprise measurements of an admittance of the selected one of the plurality of lines.

32. The telephony system of claim 29, wherein deriving a parameter comprises deriving line insertion loss.

33. The telephony system of claim 29, wherein making a qualification decision comprises determining that the selected one of the plurality of lines is qualified for providing high speed data services.

34. The telephony system of claim 33, wherein making a qualification decision comprises determining that the selected one of the plurality of lines is qualified for providing DSL service.

35. The telephony system of claim 33, wherein the computer program further comprises computer-executable instructions for performing an act of analyzing the one-ended measurements to determine whether the selected one of the plurality of lines has a configuration that disqualifies the selected line from providing high speed data services; and wherein the computer program is configured such that the computer-executable instructions for performing the act of making the qualification decision are executed selectively when the act of analyzing the one-ended measurements results in a determination that the selected one of the plurality of lines is not disqualified.

36. The telephony system of claim 29, wherein the switch comprises a POTS switch and the measurement unit is switchably connected through the POTS switch to the selected one of the plurality of lines.

37. The telephony system of claim 29 wherein deriving a parameter comprises predicting the attenuation of an average line over the second frequency range and adjusting the prediction based on the measurements made on the selected one of the plurality of lines.

38. The telephony system of claim 29 wherein the second, higher frequency range spans frequencies including 0.1 MHz to 0.5 MHz.

39. The telephony system of claim 29, wherein the computer program further comprises computer-executable instructions for performing an act of measuring noise levels with the measurement unit on the selected one of the plurality of lines and making a qualification decision comprises making a qualification decision based on the representation of attenuation of the selected one of the plurality of lines and the measured noise level.

* * * * *